(12) United States Patent
Watanabe

(10) Patent No.: US 8,262,234 B2
(45) Date of Patent: Sep. 11, 2012

(54) IMAGE DISPLAY DEVICE USING VARIABLE-FOCUS LENS AT CONJUGATE IMAGE PLANE

(75) Inventor: Mitsuyoshi Watanabe, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 128 days.

(21) Appl. No.: 12/844,094

(22) Filed: Jul. 27, 2010

(65) Prior Publication Data
US 2010/0289970 A1  Nov. 18, 2010

Related U.S. Application Data

(63) Continuation-in-part of application No. PCT/JP2009/051044, filed on Jan. 23, 2009.

(30) Foreign Application Priority Data
Jan. 29, 2008 (JP) ................................ 2008-017043

(51) Int. Cl.
*G03B 21/14* (2006.01)
*G02B 23/24* (2006.01)
(52) U.S. Cl. ........................................ 353/101; 359/434
(58) Field of Classification Search .............. 353/94, 353/99, 101, 122; 359/441, 630–633, 434
See application file for complete search history.

(56) References Cited

U.S. PATENT DOCUMENTS

| 5,321,416 A * | 6/1994 | Bassett et al. ................... 345/8 |
| 6,714,174 B2 | 3/2004 | Suyama et al. |
| 2002/0047837 A1 | 4/2002 | Suyama et al. |
| 2003/0142086 A1 * | 7/2003 | Watanabe et al. ............. 345/204 |

FOREIGN PATENT DOCUMENTS

| JP | A-9-297282 | 11/1997 |
| JP | A-2001-194617 | 7/2001 |

OTHER PUBLICATIONS

International Search Report dated Feb. 17, 2009 in International Application No. PCT/JP2009/051044 (with translation).

* cited by examiner

*Primary Examiner* — Georgia Y Epps
*Assistant Examiner* — Don Williams
(74) *Attorney, Agent, or Firm* — Oliff & Berridge, PLC

(57) ABSTRACT

An image display device for optically displaying an image is disclosed. This device includes: a light source; an imaging-light generator converting light emitted from the light source, into imaging light representative of the image to be displayed, to thereby generate the imaging light; a relay optical system focusing the imaging light emitted from the imaging-light generator, on an image plane which is located at an optically conjugate position to the imaging-light generator, the relay optical system defining a pupil through which the imaging light passes, within the relay optical system; a variable-focus lens disposed at a position generally coincident with the pupil, the variable-focus lens having a varying focal length; and a wavefront-curvature adjuster configured to vary the focal length by operating the variable-focus lens, to thereby adjust a wavefront curvature of the imaging light emitted from the relay optical system.

11 Claims, 22 Drawing Sheets

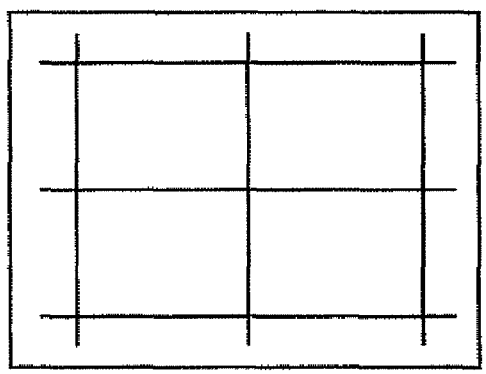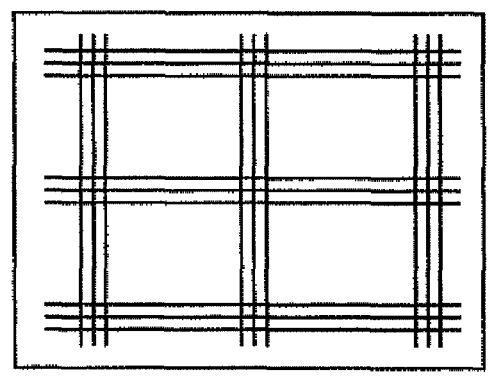
FIG.6A        FIG.6B

| FRAME | SUB-FRAME | DISPLAYING MODE | DIOPTER |
|---|---|---|---|
| 1 | 1 | 0 | 0 |
| | 2 | 1 | -0.5 |
| | 3 | 2 | -1.0 |
| | 4 | 3 | -1.5 |
| | 5 | 4 | -2.0 |
| | 6 | 5 | -2.5 |

FIG.8

FN=1  FN=2
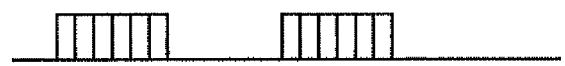
R
G
B
Z
FIG.9A
SFN=1 (MODE 0)  ...  SFN=6 (MODE 5)
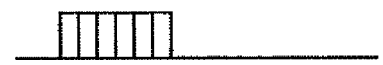 ... 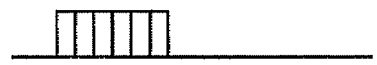
R                     R
 ... 
G                     G
 ... 
B                     B
FIG.9B

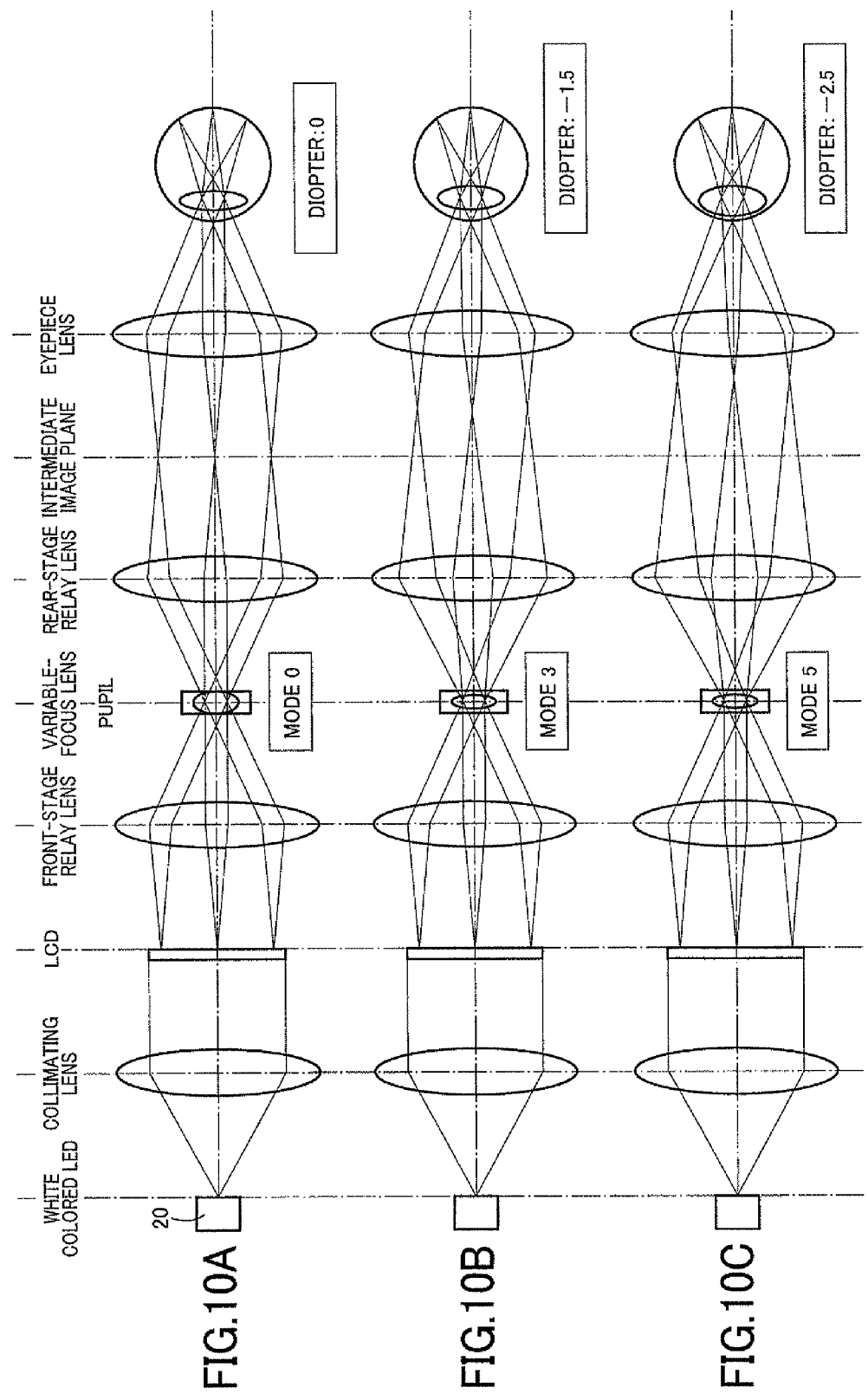

FOCAL-LENGTH DISTRIBUTION PATTERNS
No.1
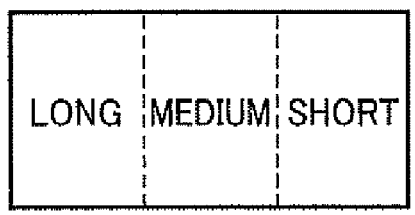
No.2
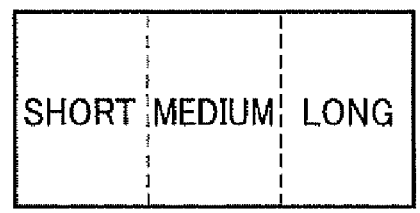
No.3
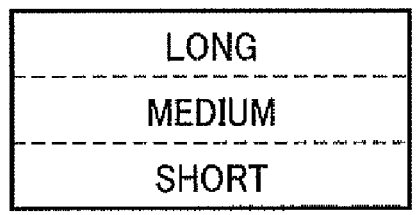
No.4
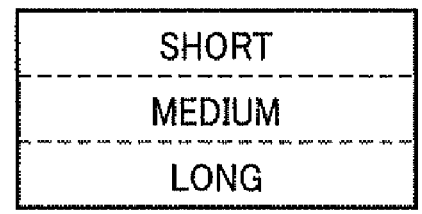
FIG.18

US 8,262,234 B2

IMAGE DISPLAY DEVICE USING VARIABLE-FOCUS LENS AT CONJUGATE IMAGE PLANE

CROSS-REFERENCE TO RELATED APPLICATIONS

The present application is based on and claims the benefit of priority from Japanese Patent Application No. 2008-017043 filed Jan. 29, 2008, and International Application No. PCT/JP2009/051044 filed Jan. 23, 2009, the contents of which are incorporated herein by reference in their entirety.

This application is a continuation-in-part application of International Application No. PCT/JP2009/051044 filed Jan. 23, 2009, now pending, which was published in Japanese under PCT Article 21(2).

BACKGROUND OF THE INVENTION

1. Field of the Invention

The invention relates generally to techniques of optically displaying an image, and more particularly to improvements in techniques of adjusting a wavefront curvature of imaging light representing an image to be displayed.

2. Description of the Related Art

As techniques of optically displaying an image, there are known, for example, a technique of projecting imaging light representing an image to be displayed, directly onto a viewer's retina, to thereby allow the viewer to perceive the image as a virtual image, and a technique of projecting such imaging light onto a physical display screen, to thereby allow the viewer to perceive the image as a real image.

Further, as techniques of converting light emitted from a light source into imaging light representing an image to be displayed, there are known, for example, a technique of spatially modulating surface light emitted from a light source at a time, using a spatial light modulator such as an LCD (Liquid-Crystal Display), on a per-pixel basis, to thereby generate the imaging light in the form of surface light, and a technique of two-dimensionally scanning an intensity-modulated light beam emitted from a light source, using a scanner, to thereby convert the light beam into the imaging light in the form of surface light.

Japan Patent Application Publication No. hei 9-297282 discloses a head-mounted display device acting as an exemplary device for optically displaying an image. This head-mounted display device employs a technique of projecting imaging light representing an image to be displayed, directly onto a viewer's retina, to thereby allow the viewer to perceive the image as a virtual image, and a technique of spatially modulating surface light emitted from a light source at a time, using a spatial light modulator such as an LCD (Liquid-Crystal Display), on a per-pixel basis.

The disclosed head-mounted display device further employs a variable-focus lens for varying the position of a virtual image in a depth direction, for three-dimensional representation of a moving picture.

BRIEF SUMMARY OF THE INVENTION

The Japan Patent Application Publication No. hei 9-297282 discloses that employment of a variable-focus lens allows modulation of an optical factor that can determine the depth of imaging light, which is to say, a wavefront curvature of the imaging light.

The Japan Patent Application Publication No. hei 9-297282, however, fails to disclose that there is a given relation between the size and the position of the variable-focus lens, and therefore, fails to disclose where to locate the variable-focus lens for downsizing.

In view of the foregoing, it would be desirable to locate the variable-focus lens at a position which is suitable for downsizing the variable-focus lens.

According to some aspects of the invention, an image display device for optically displaying an image is provided. This image display device comprises:

a light source;

an imaging-light generator converting light emitted from the light source, into imaging light representative of the image to be displayed, to thereby generate the imaging light;

a relay optical system focusing the imaging light emitted from the imaging-light generator, on an image plane which is located at an optically conjugate position to the imaging-light generator, the relay optical system defining a pupil through which the imaging light passes, within the relay optical system;

a variable-focus lens disposed at a position generally coincident with the pupil, the variable-focus lens having a varying focal length; and a wavefront-curvature adjuster configured to vary the focal length by operating the variable-focus lens, to thereby adjust a wavefront curvature of the imaging light emitted from the relay optical system.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6A is a front view illustrating a test pattern to be displayed as a result of the execution of the calibration program depicted in FIG. 5, and FIG. 6B is a front view for explanation of a viewer's fuzzy perception of the test pattern;

FIG. 8 is a table chart for explanation of division of one frame into a plurality of sub-frames as a result of the execution of the image display program depicted in FIG. 7, and a correspondence between a plurality of display modes and a plurality of diopter values;

FIG. 9A is a time chart illustrating R, G and B luminance signals and a Z signal, on a per-frame basis, and FIG. 9B is a time chart for explanation of division of one frame (whose FN=1) into six sub-frames (whose SFNs=1-6);

FIG. 10A is an optical path diagram illustrating the head-mounted display device 10 depicted in FIG. 1 with a variable-focus lens 50 operating in display mode 0, FIG. 10B is an optical path diagram illustrating the head-mounted display device 10 depicted in FIG. 1 with the variable-focus lens 50 operating in display mode 3, and FIG. 10C is an optical path diagram illustrating the head-mounted display device 10 depicted in FIG. 1 with the variable-focus lens 50 operating in display mode 5;

FIG. 18 is a front view illustrating a plurality of focal-length distribution patterns for use in the execution of the image-distortion cancel program depicted in FIG. 17;

DETAILED DESCRIPTION OF THE INVENTION

Figure 1:
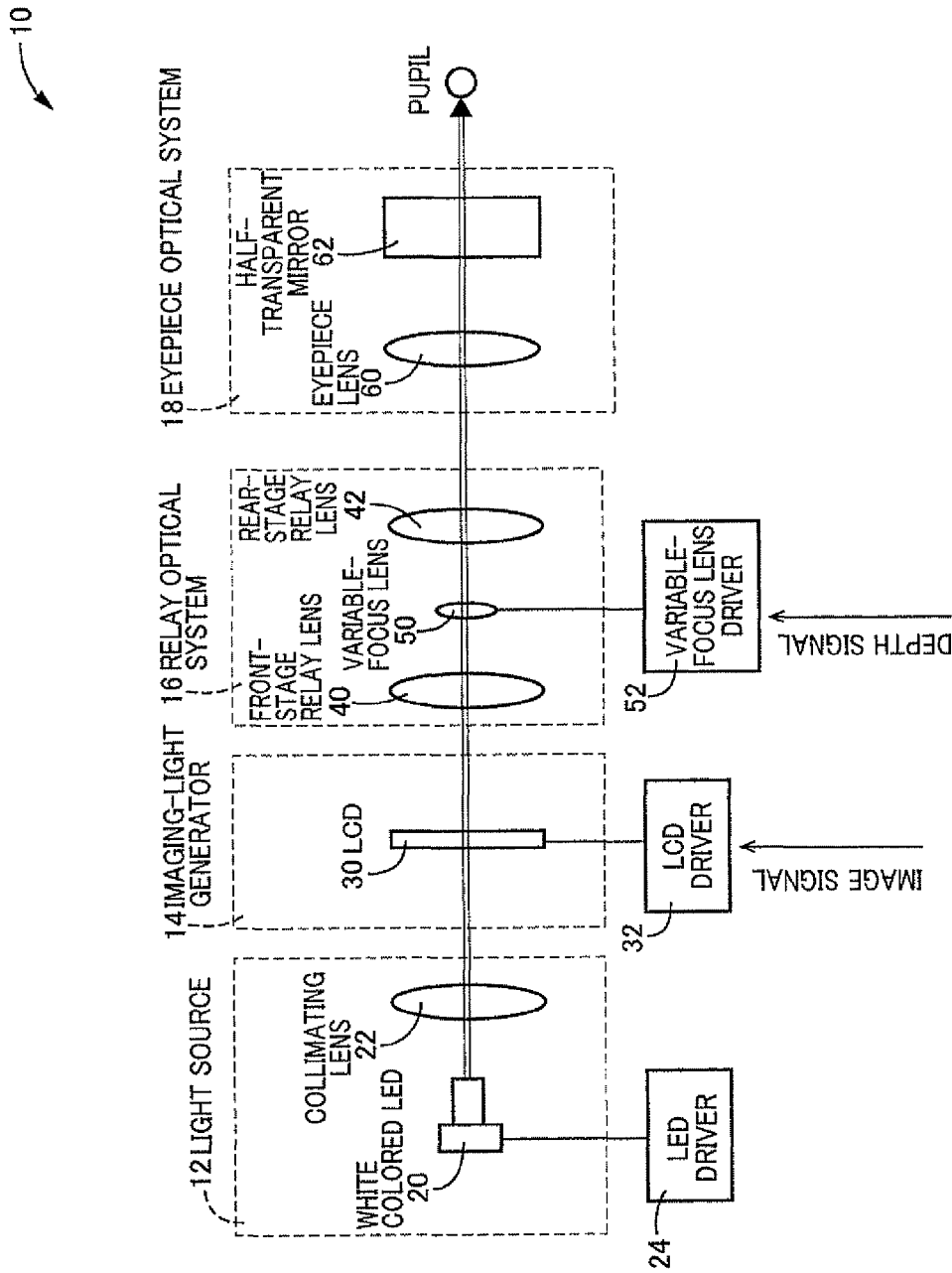
FIG. 1 is a schematic diagram conceptually illustrating a head-mounted display device 10 according to an illustrative first embodiment of the invention.

According to the invention, the following modes are provided as illustrative embodiments of the invention:

(1) An image display device for optically displaying an image, comprising:
a light source;
an imaging-light generator converting light emitted from the light source, into imaging light representative of the image to be displayed, to thereby generate the imaging light;
a relay optical system focusing the imaging light emitted from the imaging-light generator, on an image plane which is located at an optically conjugate position to the imaging-light generator, the relay optical system defining a pupil through which the imaging light passes, within the relay optical system;
a variable-focus lens disposed at a position generally coincident with the pupil, the variable-focus lens having a varying focal length; and
a wavefront-curvature adjuster configured to vary the focal length by operating the variable-focus lens, to thereby adjust a wavefront curvature of the imaging light emitted from the relay optical system.

(2) The image display device according to mode (1), wherein the wavefront-curvature adjuster includes a modulator modulating the wavefront curvature based on depth information of the image.

(3) The image display device according to mode (1), wherein the image is made up of a series of successive frames,
the imaging-light generator includes a generating section configured to generate the imaging light, on a per-frame basis, so that a plurality of pixels representing each frame are displayed at a time, and
the wavefront-curvature adjuster includes an adjusting section configured to adjust the wavefront curvature, on a per-frame basis, in synchronization with display of the successive frames.

(4) The image display device according to mode (1), wherein the image is made up of a collection of a plurality of pixels, and
the wavefront-curvature adjuster includes an adjusting section configured to adjust the wavefront curvature, on a per-pixel basis or a per-pixel-group basis.

In this mode, the "pixel group" refers to selected ones of pixels of one image or one frame, which share the same depth value, but are not required to be adjacent to each other in the same image or frame, meaning that each pixel group can include pixels located separately.

(5) The image display device according to mode (1), wherein the image the image is made up of a series of successive frames,
each frame is made up of a collection of a plurality of pixels,
the imaging-light generator includes a generating section configured to generate the imaging light, on a per-frame basis, so that the plurality of pixels representing each frame are displayed in a time-division sequence, on a per-pixel basis or a per-pixel-group basis, and
the wavefront-curvature adjuster includes an adjusting section configured to adjust the wavefront curvature, on a per-pixel basis or a per-pixel-group basis, in synchronization with display of the successive pixels or pixels groups.

This device allows a wavefront curvature of the imaging light to be adjusted, on a per-pixel basis or a per-pixel-group basis, in synchronization with display of successive pixels or pixels groups, resulting in synchronization between display of an image and representation of depth, for each pixel or pixel group.

(6) The image display device according to mode (1), wherein the variable-focus lens includes at least one of a liquid-crystal lens, a liquid lens, and a movable lens which is movable along an optical axis of the relay optical system.

(7) The image display device according to mode (1), wherein the imaging-light generator includes at least one of an optical scanner, and a flat panel display.

(8) The image display device according to mode (7), wherein the imaging-light generator includes the flat panel display, and the flat-panel display includes at least one of a liquid-crystal display, an organic electroluminescence display, and a digital micro-mirror device.

(9) The image display device according to mode (1), further comprising:

an eyepiece optical system disposed downstream of the relay optical system, and a wavefront-curvature offset mechanism configured to move the eyepiece optical system along an optical axis of the eyepiece optical system, and holding the eyepiece optical system at an arbitrarily-selected position, to thereby offset the wavefront curvature from a default value.

(10) The image display device according to mode (1), further comprising a calibrator configured to move the variable-focus lens along an optical axis of the relay optical system, and holding the variable-focus lens at an arbitrarily-selected position, to thereby calibrate a location of the variable-focus lens relative to the relay optical system.

Several presently preferred embodiments of the invention will be described in more detail by reference to the drawings in which like numerals are used to indicate like elements throughout.

Referring now to FIG. 1, there is illustrated conceptually a head-mounted display device 10 according to an illustrative first embodiment of the invention. This head-mounted display device 10 is an image display device which is mounted on a viewer's head (not shown) when in use.

The head-mounted display device 10 is generally configured to spatially modulate surface light emitted from a light source at a time, using a spatial light modulator, on a per-pixel basis, and project the thus-generated imaging light through the viewer's pupil, directly onto the viewer's retina, to thereby allow the viewer to view an image as a virtual image.

More specifically, the head-mounted display device 10 is configured to include a light source 12; an imaging-light generator 14; a relay optical system 16; and an eyepiece optical system 18, in a linear array, in the description order.

The light source 12 is configured to include a white colored LED (Light-Emitting Diode) 20 acting as an exemplary light source, and a collimating lens 22 for collimating white light emitted from the while colored LED 20. The white colored LED 20 is driven by an LED driver 24, to thereby emit white light.

The imaging-light generator 14 is configured to include an LCD (Liquid-Crystal Display) 30 which is an example of a flat panel display (i.e., an exemplary spatial light modulator). The LCD 30 is configured to include a color filter (e.g., an ROB filter) for decomposing the white light emitted from the collimating lens 22 into three color light components (i.e., RGB components), on a per-pixel basis, and a liquid-crystal panel for controlling transparency or transmissivity to each light component. The liquid-crystal panel has a plurality of pixels, and controls the transmissivity to each light component, on a per-pixel basis.

Some examples of the LCD 30 are disclosed in Japanese Patent Application Publication No. hei 11-194313, the content of which is incorporated hereinto by reference in its entirety. The LCD 30 is driven by an LCD driver 32, to thereby spatially modulate the white light emitted from the white colored LED 20.

In the present embodiment, the imaging-light generator 14 is configured to use, but not limited to, a flat panel display as a principle component, and may alternatively be configured to use, for example, an optical scanner as a principle component. In this alternative, the head-mounted display device 10 is referred to also as "retinal scanning display device."

In addition, in the present embodiment, an flat panel display is exemplified as, but not limited to, the LCD 30, and may alternatively be exemplified as, for example, an organic electroluminescence display or a digital micro-mirror device.

The relay optical system 16 is configured to focus the imaging light emitted from the imaging-light generator 14, on an image plane (i.e., an intermediate image plane depicted in FIG. 2) which is located at an optically conjugate position to the imaging-light generator 14. More specifically, the relay optical system 16 is configured to include a front-stage relay lens 40 and a rear-stage relay lens 42.

The LCD 30 is disposed at a front focus point of the front-stage relay lens 40, a variable-focus lens 50 is disposed at a back focus point (i.e., a pupil) of the front-stage relay lens 40, and the variable-focus lens 50 is disposed at a front focus point (i.e., the pupil) of the rear-stage relay lens 42. The variable-focus lens 50 is variable in focal length. For varying the focal length, the variable-focus lens 50 is driven or operated by a variable-focus lens driver 52.

The variable-focus lens 50 may be in the form of, but not limited to, a liquid-crystal lens or a liquid lens in which a refractive index or a refractory power or a lens' shape is variable, and may be alternatively in the form of, for example, a movable lens which is movable along the optical axis of the relay optical system 16. Some examples of a liquid-crystal lens and a liquid lens are disclosed in Japanese Patent Application Publication No. 2006-285182, the content of which is incorporated hereinto by reference in its entirety.

The eyepiece optical system 18 is configured to include an eyepiece lens 60 and a half-transparent (half-silvered) mirror 62 which acts as an optical guide for guiding or directing the imaging light emitted from the eyepiece lens 60, into the viewer's pupil (i.e., a user's pupil).

In the present embodiment, the optical guide is in the form of the half-transparent mirror 62, allowing the viewer to view the imaging light emitted from the eyepiece lens 60, by reflection from the half-transparent mirror 62, to thereby perceive a display image, while viewing an outside real world scene through the half-transparent mirror 62. That is, the head-mounted display device 10 is of a see-through type which allows the viewer to perceive a display image superimposed on a real outside world scene.

Figure 2:
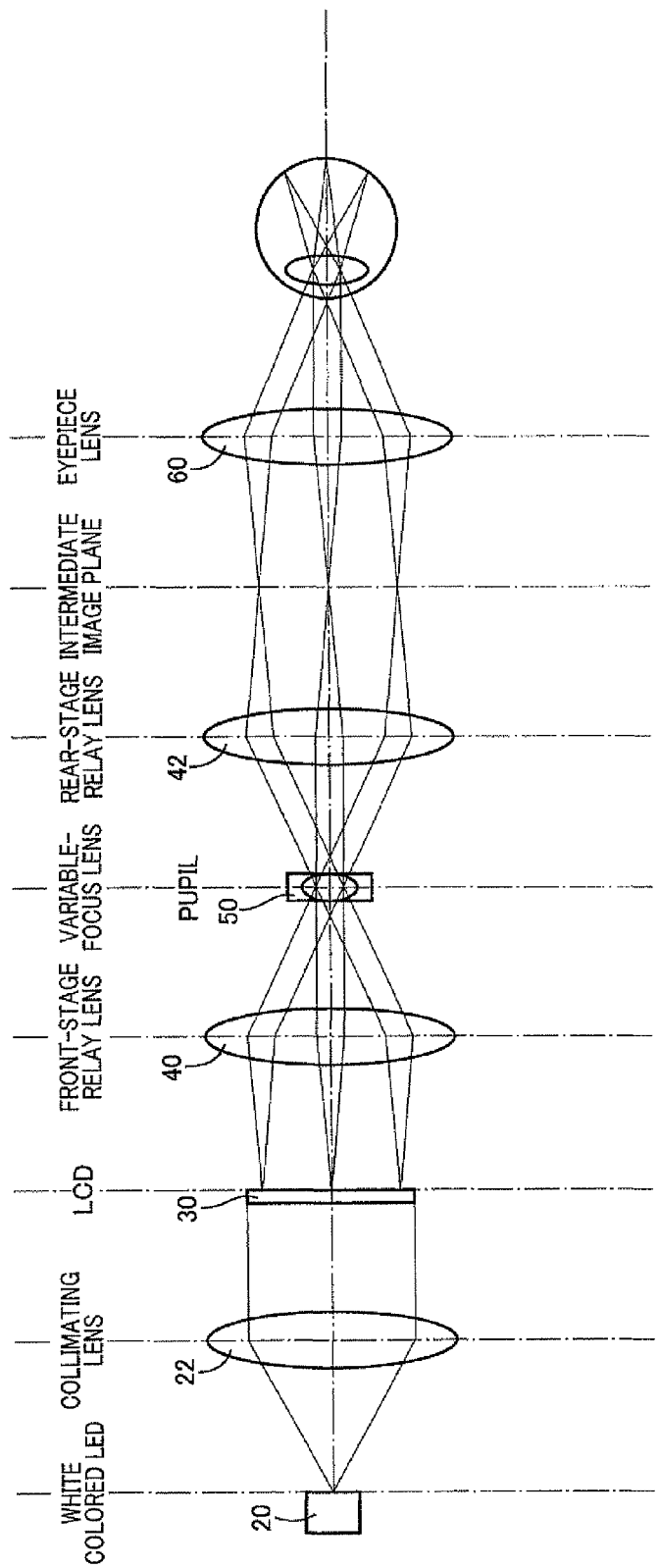
FIG. 2 is an optical path diagram illustrating the head-mounted display device 10 depicted in FIG. 1.

FIG. 2 illustrates in optical path diagram the head-mounted display device 10. The variable-focus lens 50 is disposed at a position exactly coincident with the pupil of the relay optical system 16, which is to say, the back focus point of the front-stage relay lens 40, or the front focus point of the rear-stage relay lens 42. It is added that illustration of the half-transparent mirror 62 is omitted in FIG. 2.

The imaging light, which travels along an optical pathway defined within the relay optical system 16, does not have a uniform diameter over the entire length of the optical pathway, but has a minimum diameter at the position of the pupil of the relay optical system 16. The diameter of the imaging light becomes longer as it moves away from the position of the pupil. In addition, in general, the imaging light has a smaller diameter when it passes through the pupil of the relay optical system 16, than when it passes through outside the relay optical system 16.

For these reasons, in the present embodiment, the variable-focus lens 50 can be disposed at a position suitable for reducing the size and weight of the variable-focus lens 50, and improving response speed of the variable-focus lens 50.

Figure 3:
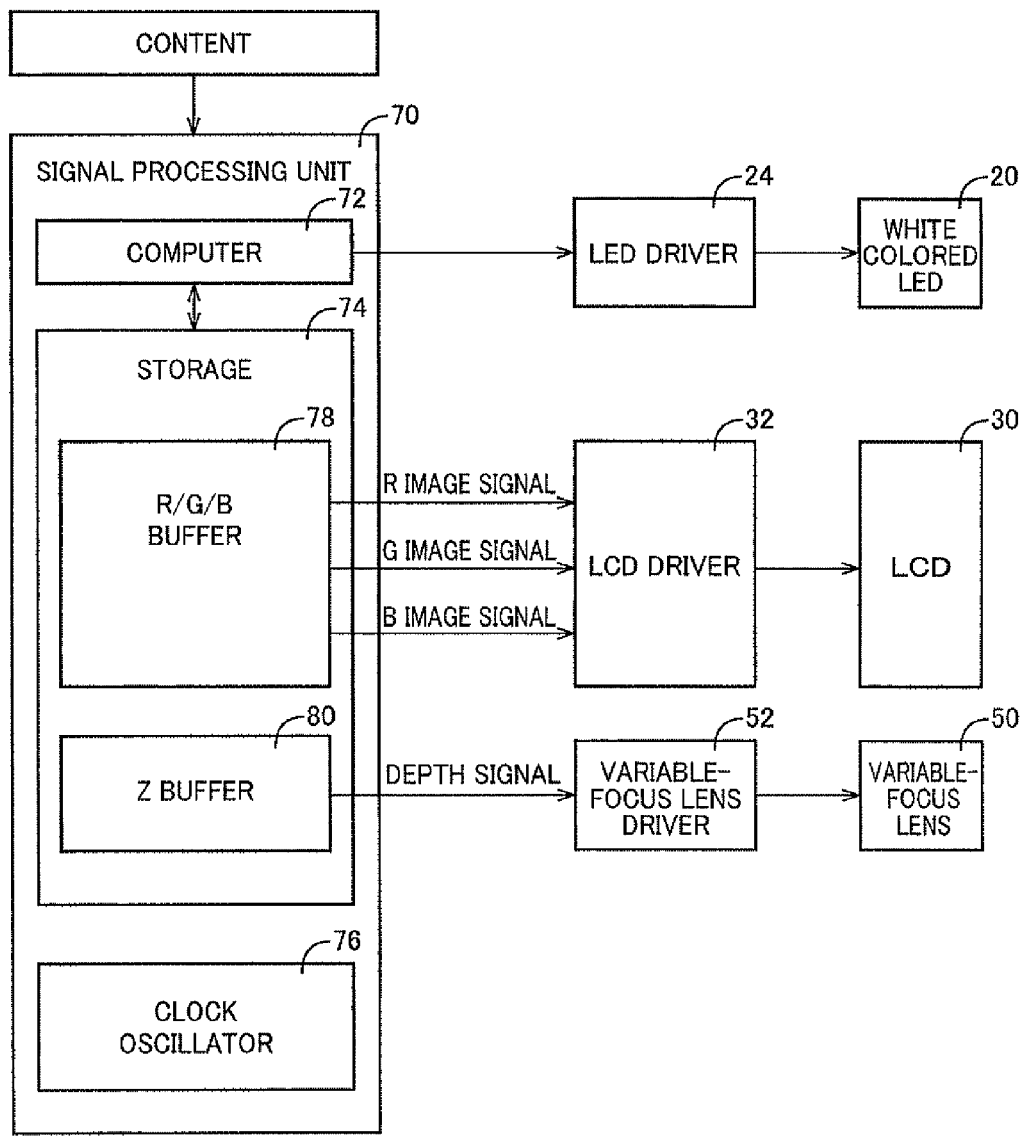
FIG. 3 is a block diagram conceptually illustrating electric features of the head-mounted display device 10 depicted in FIG. 1.
Figure 4:
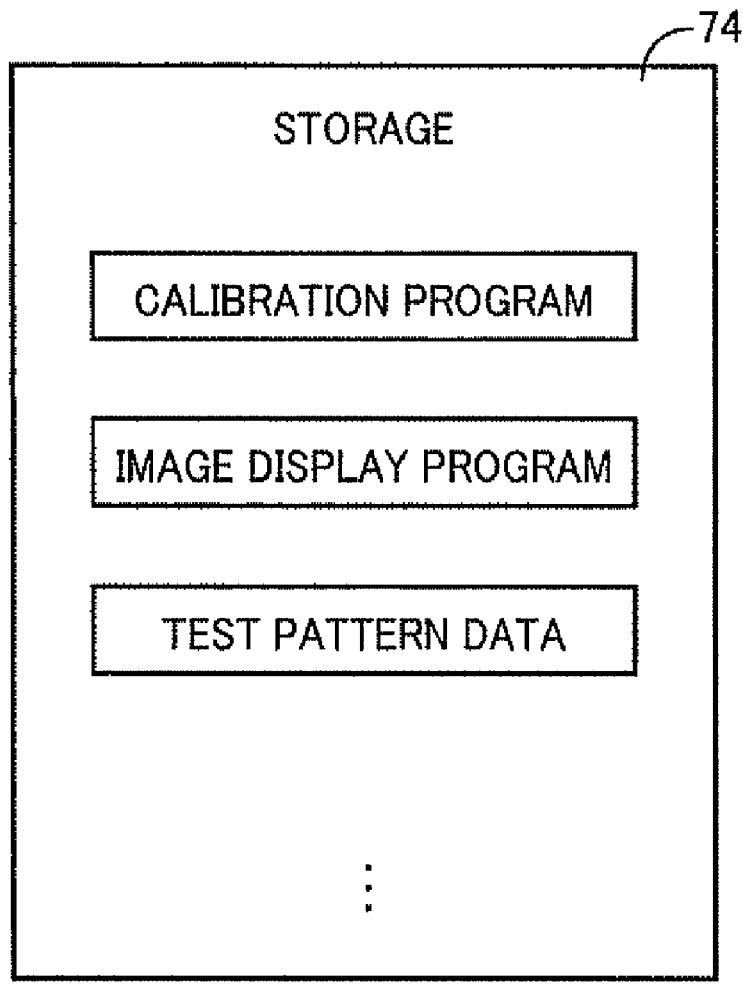
FIG. 4 is a block diagram conceptually illustrating the content of a storage 74 depicted in FIG. 3.

FIG. 3 illustrates conceptually in block diagram electric features of the head-mounted display device 10. The head-mounted display device 10 is equipped with a signal processing unit 70. The signal processing unit 70 is configured to include a computer 72, a storage 74, and a clock oscillator 76.

The signal processing unit 70 is generally configured to generate, based on data indicative of content externally supplied, a signal for displaying the content, and based on the signal, control the white colored LED 20 via the LED driver 24, the LCD 30 via the LCD driver 32, and variable-focus lens 50 via the variable-focus lens driver 52.

The content is represented by a signal in which an R (Red) luminance signal, a G (Green) luminance signal and a B (Blue) luminance signal, and a Z signal representative of a depth value, are associated with one another. The computer 72, upon reception of those signals, stores the R, G and B luminance signals in an R/G/B buffer 78 of the storage 74, and stores the Z signal in a Z buffer 80 of the storage 74.

The computer 72 generates an R image signal, a G image signal and a B image signal for controlling the LCD 30, from the R, G and B luminance signals, on a per-frame basis, supplies these image signals to the LCD driver 32, generates a depth signal from the Z signal, and supplies the depth signal to the variable-focus lens driver 52. The computer 72 synchronizes supply of the R, G and B image signals to the LCD driver 32 and supply of the depth signal to the variable-focus lens driver 52, based on a clock signal supplied from the clock oscillator 76.

As illustrated in FIG. 3, the storage 74 has further stored therein a calibration program, an image display program, and a test pattern data required for execution of the calibration program, in a non-volatile manner.

Figure 5:
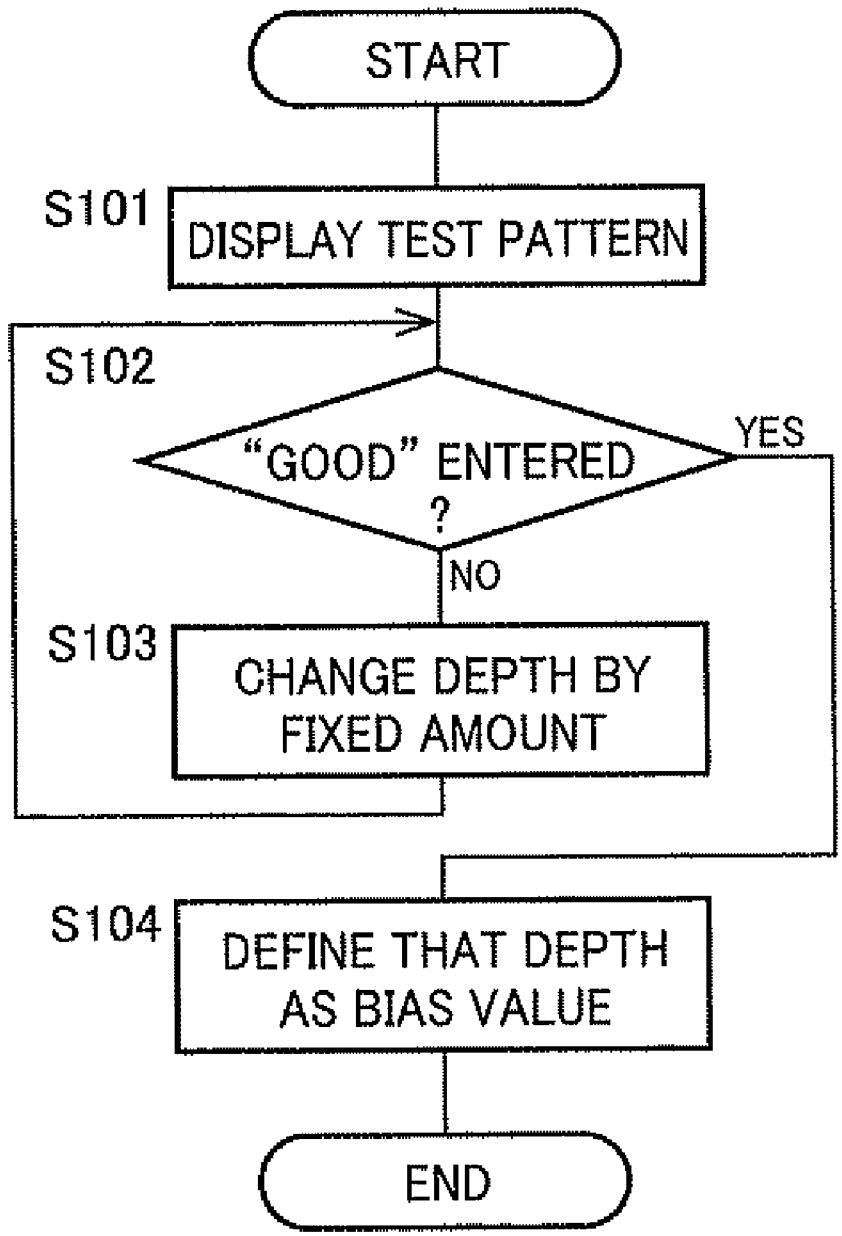
FIG. 5 is a flow chart conceptually illustrating a calibration program depicted in FIG. 4.

FIG. 5 illustrates conceptually in flow chart the calibration program. The calibration program is executed only once after the user activates a power supply (not shown) of the head-mounted display device 10.

The calibration program begins with step S101 to retrieve the test pattern data from the storage 74, and, based on the retrieved test pattern data, drive the LCD 30, to thereby project the corresponding test pattern directly onto the user's retina. FIG. 6A exemplifies the test pattern. In this regard, the depth signal is supplied to the variable-focus lens driver 52, in the form of a signal representing a default value of depth.

Step S102 is followed to make a determination as to whether the user has inputted into the computer 72, data indicative of "good" via an input device (not shown), for the user to indicate that the user has perceived the displayed test pattern sharply (in focus). If, as illustrated in FIG. 6B, the user has perceived the test pattern fuzzily (out of focus) and therefore the user has not yet entered data indicative "good," then the determination of step S102 becomes "NO." Thereafter, step S103 is implemented to generate the depth signal so that the depth of the displayed test pattern can change from a current value, in a pre-selected one of opposite directions, by a pre-selected amount. The generated depth signal is supplied to the variable-focus lens driver 52, and as a result, the depth of the displayed test pattern is changed.

Subsequently, step S102 is implemented again to determine whether the user has entered data indicative of "good." Unless so this time too, then step S103 is implemented again to generate the depth signal so that the depth of the displayed test pattern can change from a current value, in the pre-selected direction, by the pre-selected amount.

If, as a result of the repeated implementation of steps S102 and S103, the determination of step S102 becomes "YES," then step S104 is implemented to define the current value of the depth as a fixed bias to a default value of the depth. Therefore, at the subsequent and primary stage for image display, once a desired value of depth for a display image has been designated, the designated value is corrected using the fixed bias, to thereby allow the user to perceive the display image having the desired depth sharply, irrespective of whether or not the user's vision (in the user's eye) is poor.

Then, the execution of the calibration program is terminated.

Figure 7:
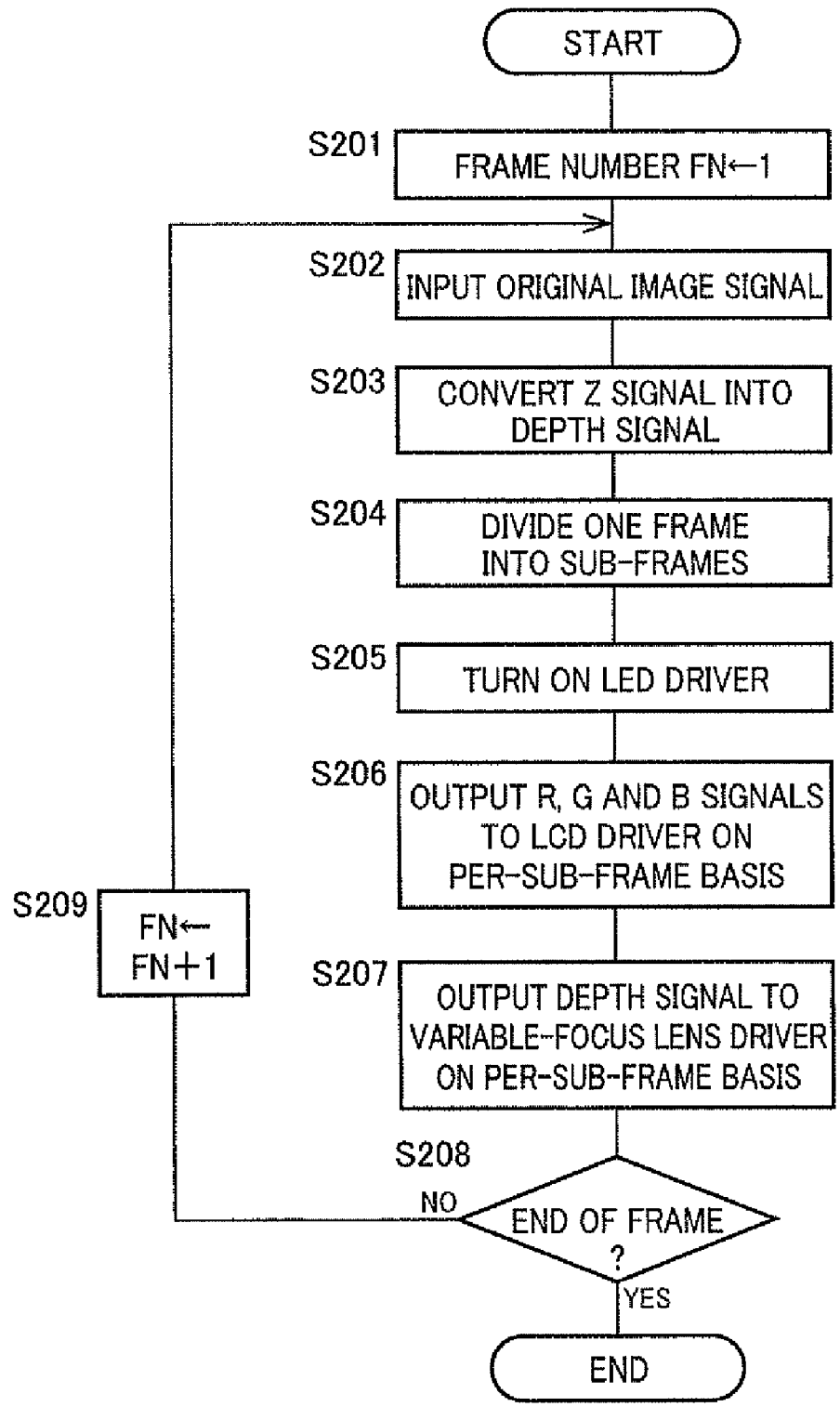
FIG. 7 is a flow chart conceptually illustrating an image display program depicted in FIG. 4.

FIG. 7 illustrates conceptually inflow chart the image display program. The image display program is executed, after the user activates the power supply of the head-mounted display device 10, and in response to the user's action of turning on an image start switch (not shown) with selection of an image to be displayed. This time, it is presupposed that the user selects content which is an image represented by a series of successive frames (e.g., a moving picture in which an object varies in depth with time, or one still picture in which sub-pictures are different in depth and each depth is not time-varying), as a display image.

The image display program begins with step S201 to set a frame number FN to "1." Step S202 is followed to input an image signal representing a current one of the successive frames which together represent the content to be displayed, as an original image signal. The original image signal includes the R, G and B luminance signals and the Z signal.

Step S203 is followed to extract the Z signal from the original image signal, and convert the Z signal into a depth signal. More specifically, the maximum count of levels of depth which can be achieved by the variable-focus lens 50 (i.e., 6 depth levels in the present embodiment) is pre-defined as a value smaller than the maximum count of levels of depth which can be represented by the Z signal, and step S203 is implemented to convert an actual Z signal into a depth signal which represents the closest one of the six depth levels to that of the actual Z signal.

In FIG. 8, the six depth levels, which can be achieved by the variable-focus lens 50, are denoted as "display modes 0-5." Display mode 0 is a mode for displaying an image with a 0 diopter (i.e., at infinity focus) Display modes 1-5 are modes for displaying an image with −0.5, −1.0, −1.5, −2.0, and −2.5 diopters, respectively.

Therefore, as a result of the implementation of step S203, each of a plurality of pixels which together represent the current frame is assigned a corresponding one of the six display modes, on a per-pixel basis.

As illustrated in FIG. 7, upon completion of step S203, step S204 is implemented, as illustrated in FIG. 8, to divide the current frame into the same number of sub-frames as the total number of display modes. More specifically, a plurality of pixels that belong to the current frame are divided into a plurality of pixel groups each of which is assigned the same display mode (i.e., the same value of diopter), whereby the sub-frames are created to have respective unique display modes or diopter values, on a per-display-mode basis.

For example, as illustrated in FIG. 9A (i.e., a pixel-wise representation of the R, G and B luminance signals and the Z signal), when the frame number FN is equal to "1," as illustrated in FIG. 9B (i.e., a pixel-wise representation of the R, G and B luminance signals), one of the sub-frames which has been assigned a sub-frame number SFN of "1" is created, such that only ones of the entire pixels of the one sub-frame which have been assigned display mode 0 have the R, G and B luminance signals. The same formulation also applies to the sub-frames which have been assigned sub-frame numbers of "2-6," respectively. The plurality of successive sub-frames which together represent one frame are displayed in a time-division sequence (not simultaneously or continuously, but sequentially and alternately), within a duration given for displaying the one frame.

It is added that an image signal for each sub-frame is generated so that the LCD 30 can be controlled for ones of the pixels of each sub-frame which do not have the same as one depth value pre-assigned to each sub-frame, in a manner that none of R, G and B light components passes through the LCD 30.

As illustrated in FIG. 7, upon completion of step S204, step S205 is implemented to turn on the LED driver 24, to thereby turn on the white colored LED 20. Step S206 is followed to convert, on a per-sub-frame basis, the R, G and B luminance signals into R, G and B image signals for control of the LCD 30. Further, the R, G and B image signals are supplied to the LCD driver 32, on a per-sub-frame basis.

Step S207 is implemented to supply, on a per-sub-frame basis, the depth signal (i.e., a signal representing a corresponding one of the six display modes) to the variable-focus lens driver 52. The implementation of step S207 is synchronized with the implementation of step S206.

Step S208 is followed to make a determination as to whether or not the current frame is a final one of the successive frames for the current image. If the current frame is not the final frame, then the determination of step S208 becomes "NO." Thereafter, step S209 is implemented to increment the frame number FN by "1," and it goes to step S202.

If, as a result of the implementation of steps S202-S209 for all the successive frames, the determination of step S208 becomes "YES," then the execution of the image display program is terminated.

FIGS. 10A-10C illustrate optional optical path diagrams of the head-mounted display device 10, when the variable-focus lens 50 is operating in display mode 0 and with a 0 diopter, when the variable-focus lens 50 is operating in display mode 3 and with −1.5 diopters, and when the variable-focus lens 50 is operating in display mode 5 and with −2.5 diopters, respectively.

It is added that FIG. 10A, for example, illustrates the LCD 30 so as to emit three beams, and this is for illustration of how the LCD 30 emits three beams simultaneously, at three of the entire pixels of the LCD 30 which have been assigned the same display mode (=0), in other words, the same depth value or focal length, and then the three beams impinge on the variable-focus lens 50.

Thus, in the present embodiment, a plurality of novel sub-frames are generated such that each sub-frame has only pixels uniform in depth, and then, the variable-focus lens 50 is operated such that its operation mode changes on a per-sub-frame basis, to thereby achieve a desired focal length or a desired depth value, on a per-sub-frame basis.

As will be evident from the foregoing, in the present embodiment, it can be considered, for ease of description, that the signal processing unit 70 constitutes an example of the "wavefront-curvature adjuster" set forth in the mode (1), a portion of the computer 72 which is assigned for implementing steps S202, S203 and 5207 depicted in FIG. 7 constitutes an example of the "modulator" set forth in the mode (2), a portion of the computer 72 which is assigned for implementing steps S204 and 5206 depicted in FIG. 7 constitutes an example of the "generating section" set forth in the mode (3), and a portion of the computer 72 which is assigned for implementing step S207 depicted in FIG. 7 constitutes an example of the "adjusting section" set forth in the same mode.

Further, in the present embodiment, it can be considered, for ease of description, that a portion of the computer 72 which is assigned for executing the calibration program depicted in FIG. 5 constitutes another example of the "wavefront-curvature adjuster" set forth in the mode (1).

Next, an illustrative second embodiment of the invention will be described below. The present embodiment is common to the first embodiment, except that the eyepiece lens 60 is movable, and therefore, only the movement of the eyepiece lens 60 will be described while avoiding redundant description.

Figure 11:
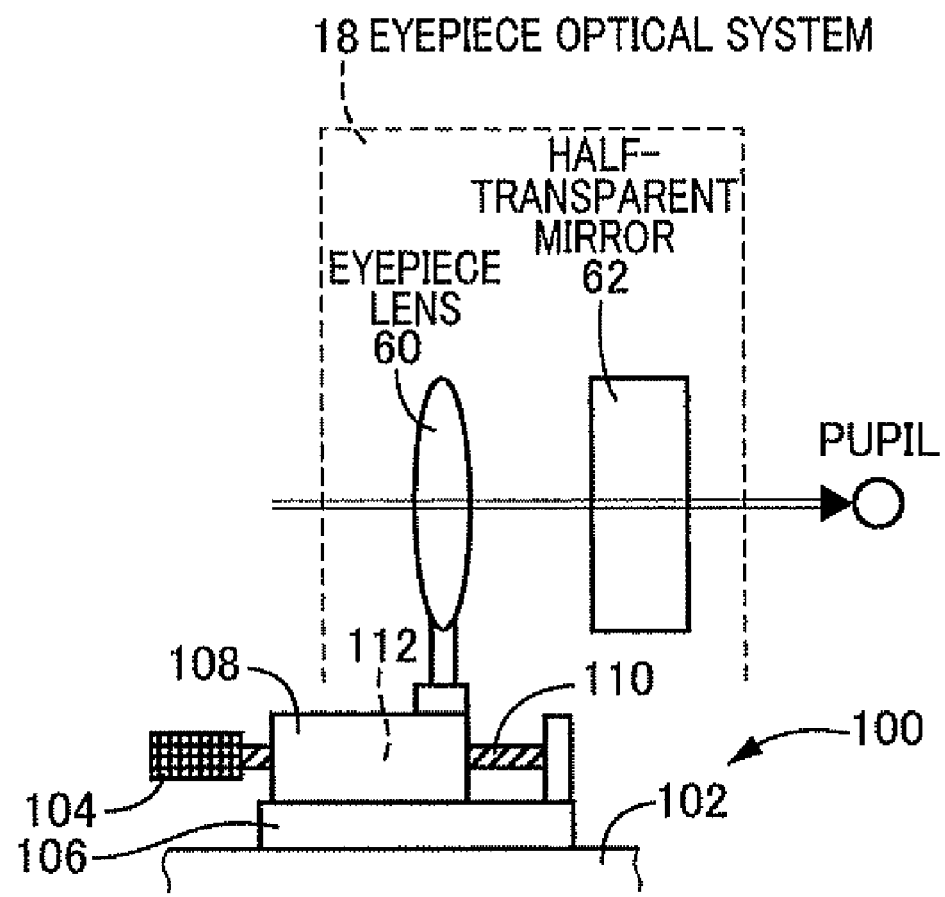
FIG. 11 is a side view illustrating a wavefront-curvature offset mechanism 100, combined with an eyepiece optical system 18, of a head-mounted display device 10 according to an illustrative second embodiment of the invention.

Referring next to FIG. 11, a wavefront-curvature offset mechanism 100 is illustrated which is configured to move the eyepiece lens 60 along its optical axis and holding the eyepiece lens 60 at an arbitrarily-selected position, to thereby offset a wavefront curvature of the imaging light from a default value.

The wavefront-curvature offset mechanism 100 is mounted on a housing (a stationary member) 102 of the head-mounted display device 10.

The wavefront-curvature offset mechanism 100 is configured to be operated manually in accordance with the user's manipulation or action, to thereby displace the eyepiece lens 60 along its optical axis. More specifically, the wavefront-curvature offset mechanism 100 is equipped with an operated portion 104 which is operated by the user (e.g., a rotary knob), a stationary portion 106 securely fixed to the housing 102, and a linearly movable portion 108 supported linearly displaceable relative to the stationary portion 106. The eyepiece lens 60 is securely fixed to the linearly movable portion 108.

The wavefront-curvature offset mechanism 100 is further equipped with a rotary portion 110 rotated by the operated portion 104, and a motion converting mechanism 112 for converting a rotary motion of the rotary portion 110 into a linear motion of the linearly movable portion 108. The motion converting mechanism 112 may be in the form of, for example, a screw mechanism in which a female thread of the linearly movable portion 108 and a male thread of the rotary portion 110 mate with each other. The wavefront-curvature offset mechanism 100 may alternatively be designed so as to be common in structure to a displacement mechanism which is employed in a well-known micrometer.

As a result, the wavefront-curvature offset mechanism 100 allows the user to displace the eyepiece lens 60 from its default position (i.e., its initial position), in a desired direction by a desired length. This allows the user to adjust the position of the eyepiece lens 60 so that the user can view a display image sharply, while viewing the display image, to thereby offset the wavefront curvature of the imaging light from the default value by a desired amount.

Next, an illustrative third embodiment of the invention will be described below. The present embodiment is common to the first embodiment, except that the variable-focus lens 50 is movable, and therefore, only the movement of the variable-focus lens 50 will be described while avoiding redundant description.

Figure 12:
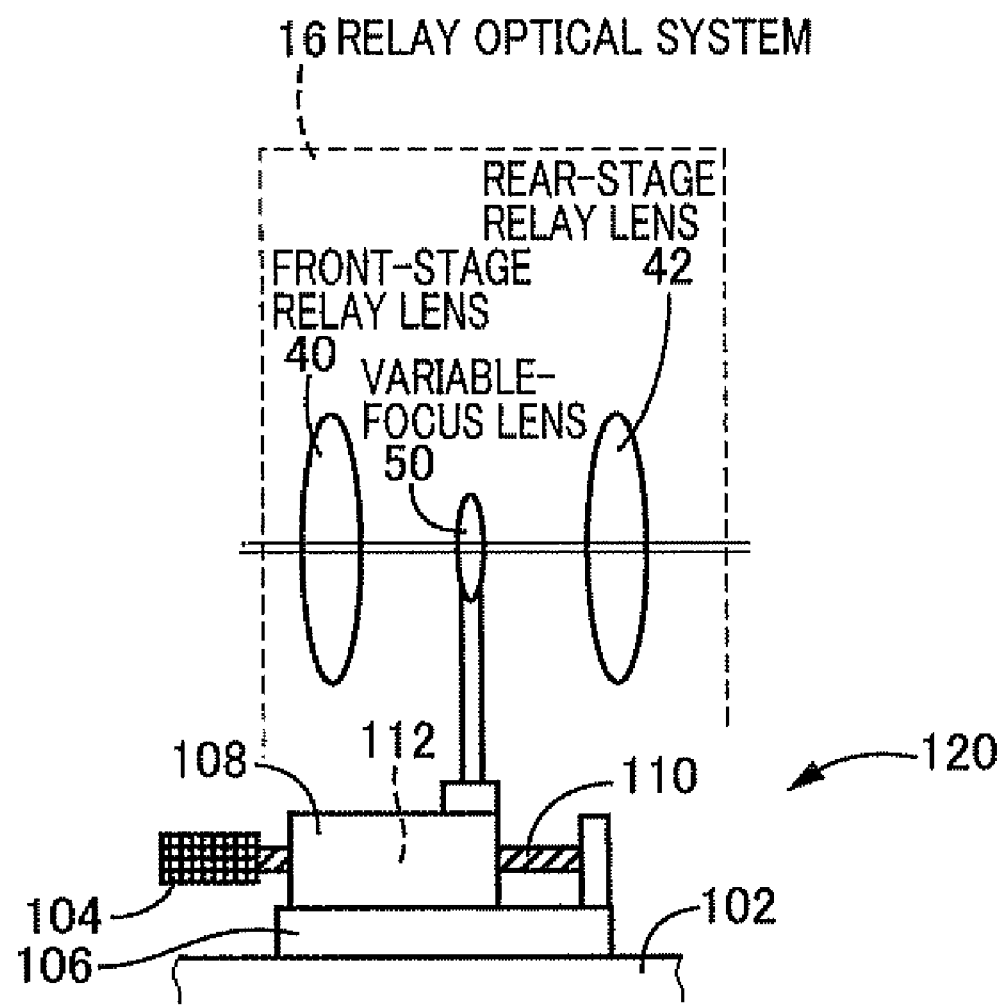
FIG. 12 is a side view illustrating a calibration mechanism 120, combined with a relay optical system 16, of a head-mounted display device 10 according to an illustrative third embodiment of the invention.

Referring next to FIG. 12, a calibration mechanism 120 is illustrated which is configured to move the variable-focus lens 50 along the optical axis of the relay optical system 16 and holding the variable-focus lens 50 at an arbitrarily-selected position, to thereby calibrate the position of the variable-focus lens 50 relative to the relay optical system 16.

The calibration mechanism 120, which is common in structure to the wavefront-curvature offset mechanism 100 in the second embodiment, is configured to include the operated portion 104; the stationary portion 106; the linearly movable portion 108; the rotary portion 110; and the motion converting mechanism 112. The variable-focus lens 50 is securely fixed to the linearly movable portion 108.

The calibration mechanism 120 allows the user to displace the variable-focus lens 50 from its default position (i.e., its initial position), in a desired direction by a desired length. This allows the user to adjust the position of the variable-focus lens 50 so that the user can view a display image sharply, while viewing the display image, to thereby offset the wavefront curvature of the imaging light from the default value by a desired amount.

Next, an illustrative fourth embodiment of the invention will be described below. The present embodiment is common to the first embodiment, except for the content of the image display program, and therefore, only the image display program will be described while avoiding redundant description.

In the first embodiment, the variable-focus lens 50 is operated such that its operation mode is changed on a per-sub-frame basis, and in the present embodiment, however, the variable-focus lens 50 is operated such that its operation mode is changed on a per-pixel basis. As with the first embodiment, in the present embodiment, each of a plurality of pixels that belong to the same frame is assigned a corresponding one of the six display modes, based on the Z signal of each pixel.

Figure 13:
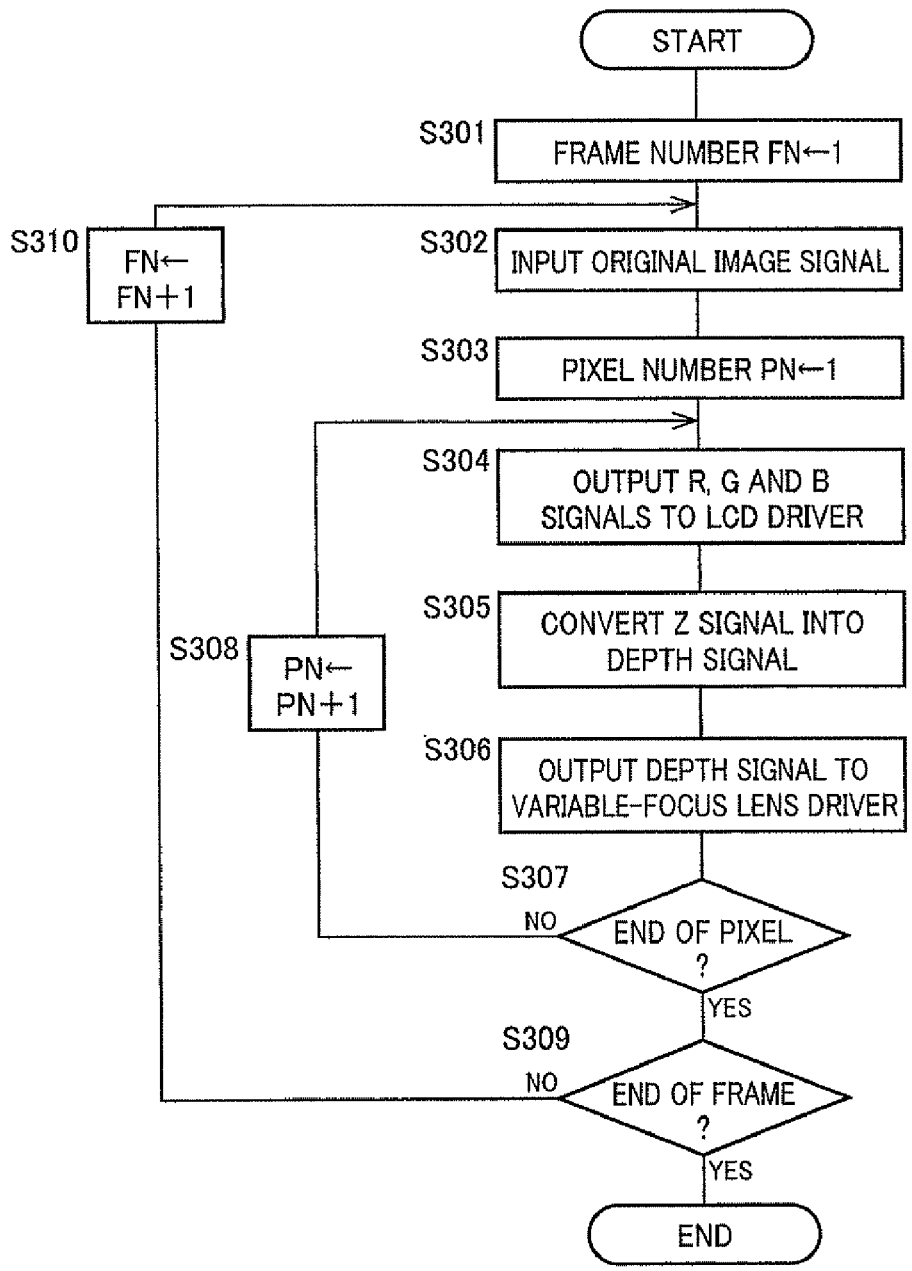
FIG. 13 is a flow chart conceptually illustrating an image display program stored in a storage 74 of a head-mounted display device 10 according to an illustrative fourth embodiment of the invention.

Referring next to FIG. 13, the image display program in the present embodiment is illustrated conceptually in flow chart. The image display program begins with step S301 to set a frame number FN to "1." Step S302 is followed to input an image signal representing a current one of the successive frames which together represent the content to be displayed, as an original image signal.

Step S303 is followed to set a pixel number PN to "1." Step S304 is followed to convert R, G and B luminance signals for a current pixel into R, G and B image signals for control of the LCD 30, and output the R, G and B image signals into the LCD driver 32. The LED driver 24 is turned on, to thereby turn on the white colored LED 20.

It is added that the R, G and B image signals for the current pixel are supplied only to one of electrodes of the LCD 30 which corresponds to the current pixel, and the LCD 30 is controlled such that none of R, G and B light components passes through the LCD 30, for the remaining electrodes of the LCD 30 which correspond to the remaining pixels.

Step S305 is followed to assign a depth signal representing one of the six display modes, to a Z signal for the current pixel, to thereby convert the Z signal to the corresponding depth signal.

Step S306 is implemented to supply the depth signal to the variable-focus lens driver 52. The implementation of step S306 is synchronized with the implementation of step S304. Step S307 is followed to make a determination as to whether or not the current pixel is a final one of the successive pixels for the current frame. If the current pixel is not the final pixel, then the determination of step S307 becomes "NO." Thereafter, step S308 is implemented to increment the pixel number PN by "1," and it goes to step S304.

If, as a result of the implementation of steps S304-S308, the determination of step S307 becomes "YES," then step S309 is followed to make a determination as to whether or not the current frame is a final one of the successive frames for the current image. If the current frame is not the final frame, then the determination of step S309 becomes "NO." Thereafter, step S310 is implemented to increment the frame number FN by "1," and it goes to step S302.

If, as a result of the implementation of steps S302-S310 for all the successive frames, the determination of step S309 becomes "YES," then the execution of the image display program is terminated.

Figure 14:
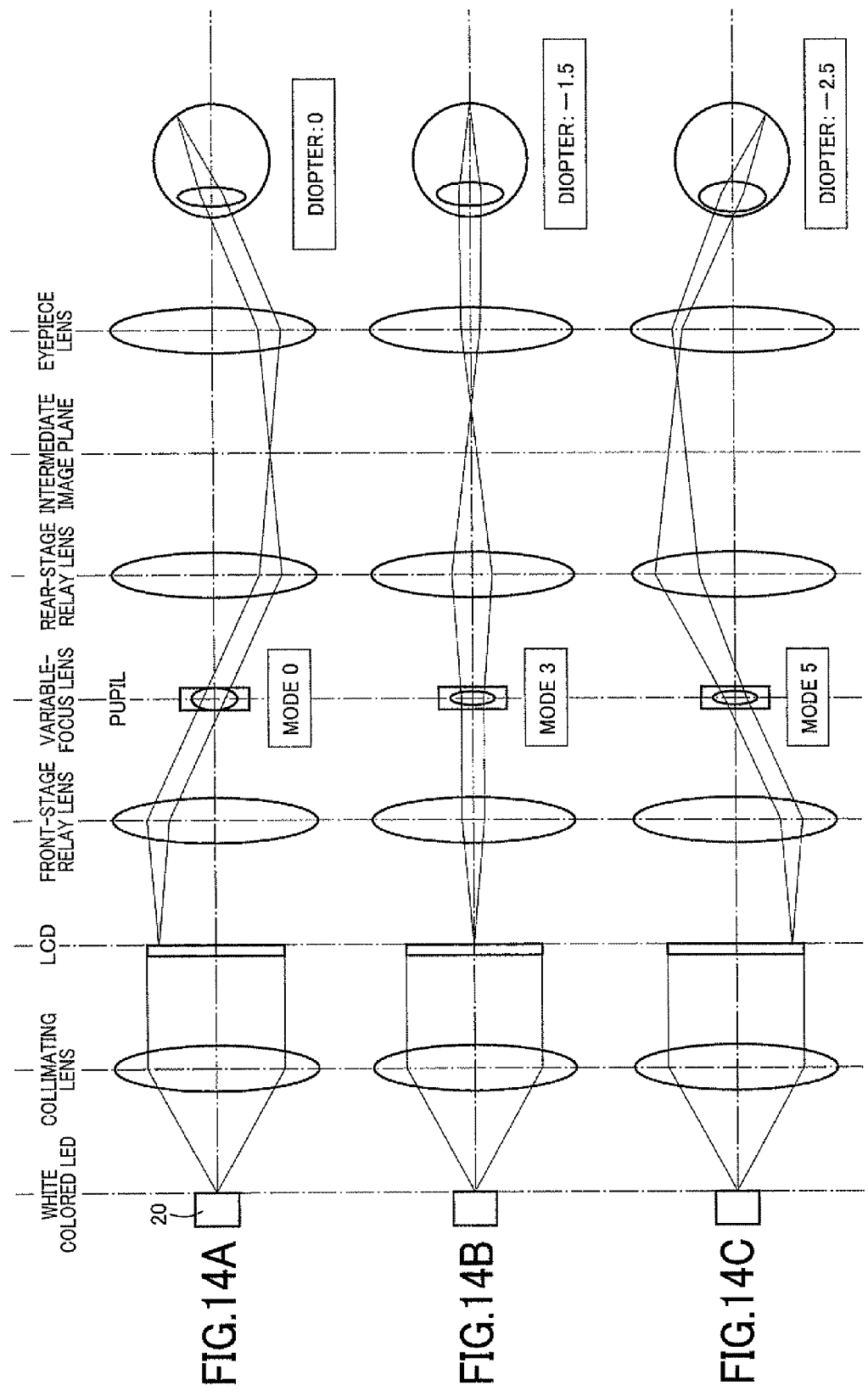
FIG. 14A is an optical path diagram illustrating the head-mounted display device 10 according to the fourth embodiment with a variable-focus lens 50 operating in display mode 0.
FIG. 14B is an optical path diagram illustrating the head-mounted display device 10 according to the fourth embodiment with the variable-focus lens 50 operating in display mode 3.
FIG. 14C is an optical path diagram illustrating the head-mounted display device 10 according to the fourth embodiment with the variable-focus lens 50 operating in display mode 5.

FIGS. 14A-14C illustrate optional optical path diagrams of the head-mounted display device 10, when the variable-focus lens 50 is operating in display mode 0 and with a 0 diopter, when the variable-focus lens 50 is operating in display mode 3 and with −1.5 diopters, and when the variable-focus lens 50 is operating in display mode 5 and with −2.5 diopters, respectively.

It is added that FIG. 14A, for example, illustrates the LCD 30 so as to emit one beam, and this is for illustration of how the LCD 30 emits one beam, only at one of the entire pixels of the LCD 30 which has been assigned the current display mode (=0), in other words, the current depth value or focal length, and then the one beam impinges on the variable-focus lens 50.

Thus, in the present embodiment, the variable-focus lens 50 is operated such that its operation mode changes on a per-pixel basis, to thereby achieve a desired focal length or a desired depth value, on a per-pixel basis.

As will be evident from the foregoing, in the present embodiment, it can be considered, for ease of description, that a portion of the computer 72 which is assigned for implementing steps S302, S304, S305 and S306 depicted in FIG. 13 constitutes an example of the "modulator" set forth in the mode (2), a portion of the computer 72 which is assigned for implementing steps S305 and S306 depicted in FIG. 13 constitutes an example of the "adjusting section" set forth in the mode (4), a portion of the computer 72 which is assigned for implementing step S304 depicted in FIG. 13 constitutes an example of the "generating section" set forth in the mode (5), and a portion of the computer 72 which is assigned for implementing step S305 and S306 depicted in FIG. 13 constitutes an example of the "adjusting section" set forth in the same mode.

Further, in the present embodiment, it can be considered, for ease of description, that a portion of the computer 72 which is assigned for executing the calibration program depicted in FIG. 5 constitutes another example of the "wavefront-curvature adjuster" set forth in the mode (1).

It is added that, in the present embodiment, the variable-focus lens 50 is operated such that its operation mode is changed, on per-pixel basis, during a display period for each frame, to thereby modulate the wavefront curvature of the imaging light, and the present invention may alternatively be practiced in an arrangement in which the variable-focus lens 50 is operated such that its operation mode is changed on a per-pixel-group basis, to thereby modulate the wavefront curvature of the imaging light, wherein pixels within the same pixel group substantially share the same depth value. This arrangement would allow the variable-focus lens 50 to be operated with lower frequency of operations and operational load than when the variable-focus lens 50 is operated such that its operation mode is changed on a per-pixel basis.

Figure 19:
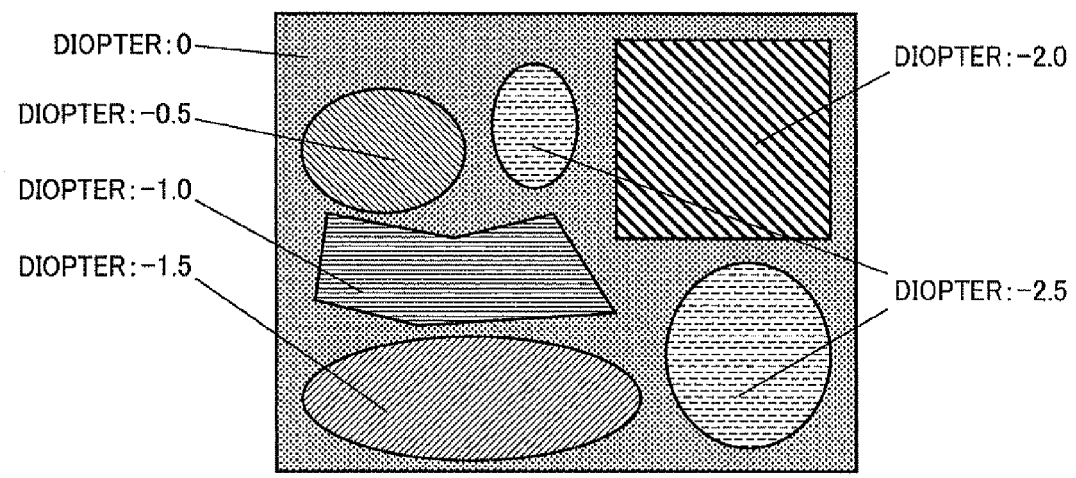
FIG. 19 is a front view illustrating an exemplary image in which a plurality of objects are arranged that are not always equal in focal length, without any overlap therebetween, for explanation of the scope of the possible applications of the invention.
Figure 20:
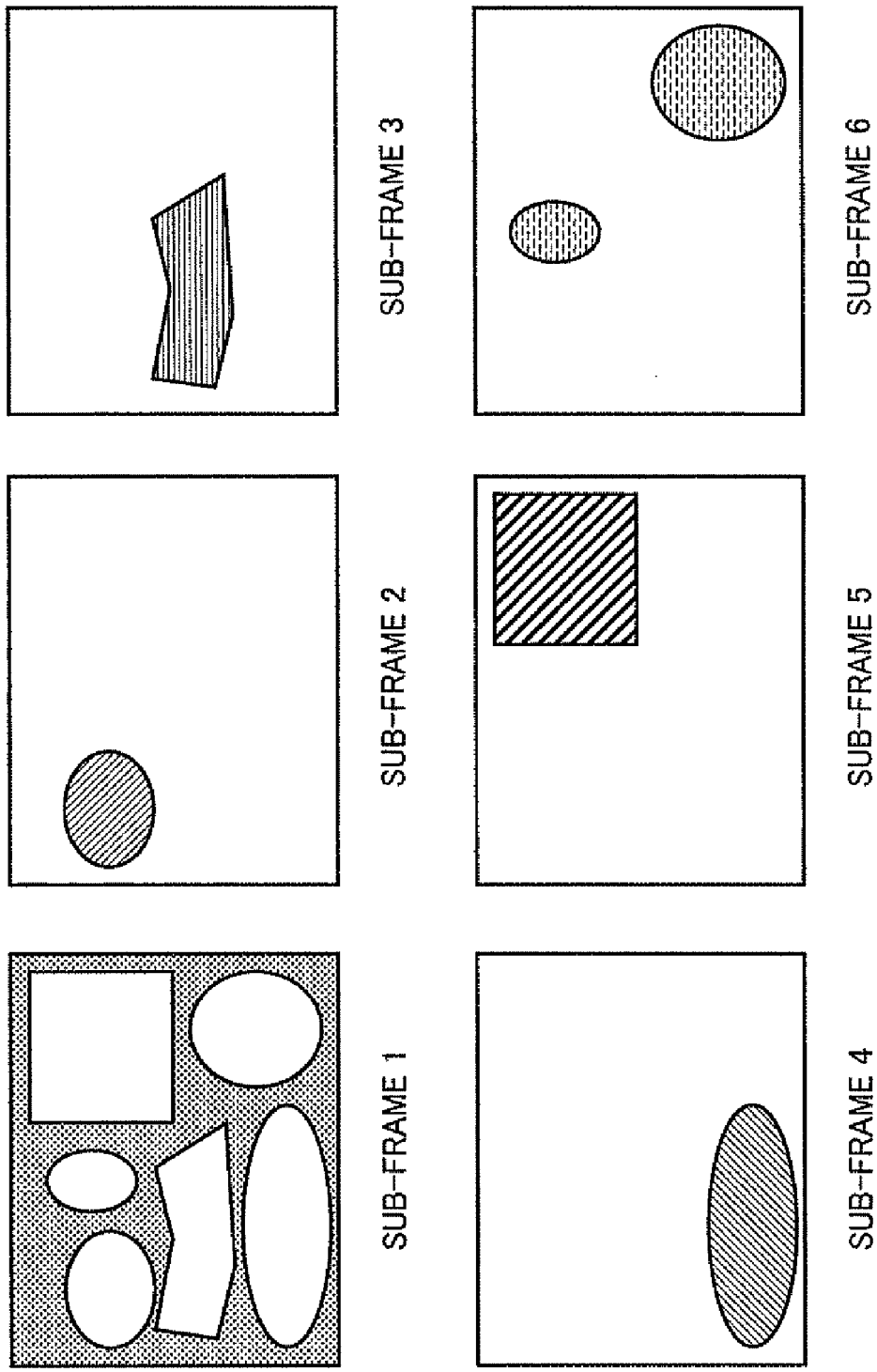
FIG. 20 is a front view illustrating a plurality of sub-frames generated for displaying the exemplary image depicted in FIG. 19.

It is further added that, as exemplified in FIG. 19, when a particular type of an image attempts to be displayed in which a plurality of objects that are not always equal in focal length are arranged without any overlap therebetween, one pixel is assigned one focal length, for all the pixels. A plurality of sub-frames for displaying such an image are exemplified in FIG. 20. In the example, one pixel is assigned to one sub-frame, for all the pixels.

Figure 21:
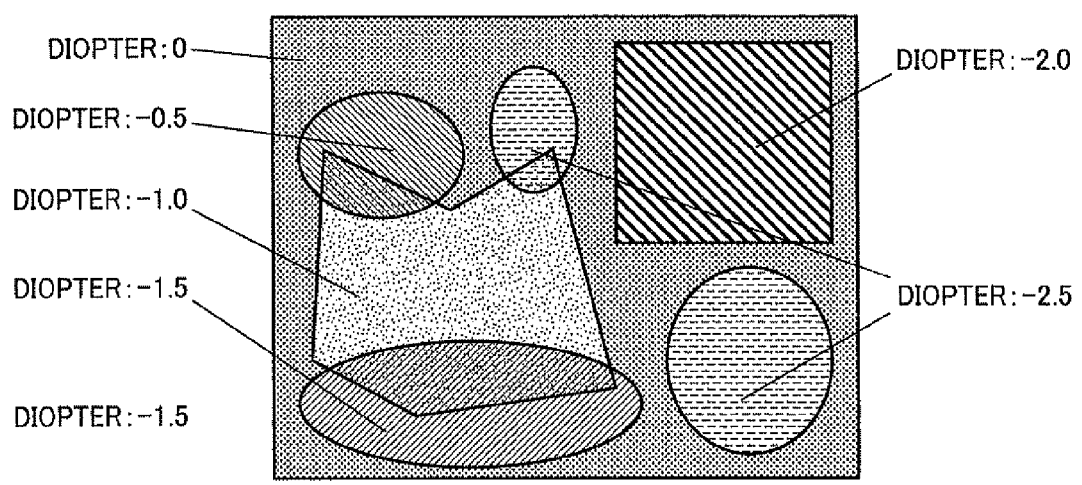
FIG. 21 is a front view illustrating an exemplary image in which a plurality of objects are arranged that are not always equal in focal length, with some of the objects overlapping therebetween, for explanation of the scope of the possible applications of the invention.
Figure 22:
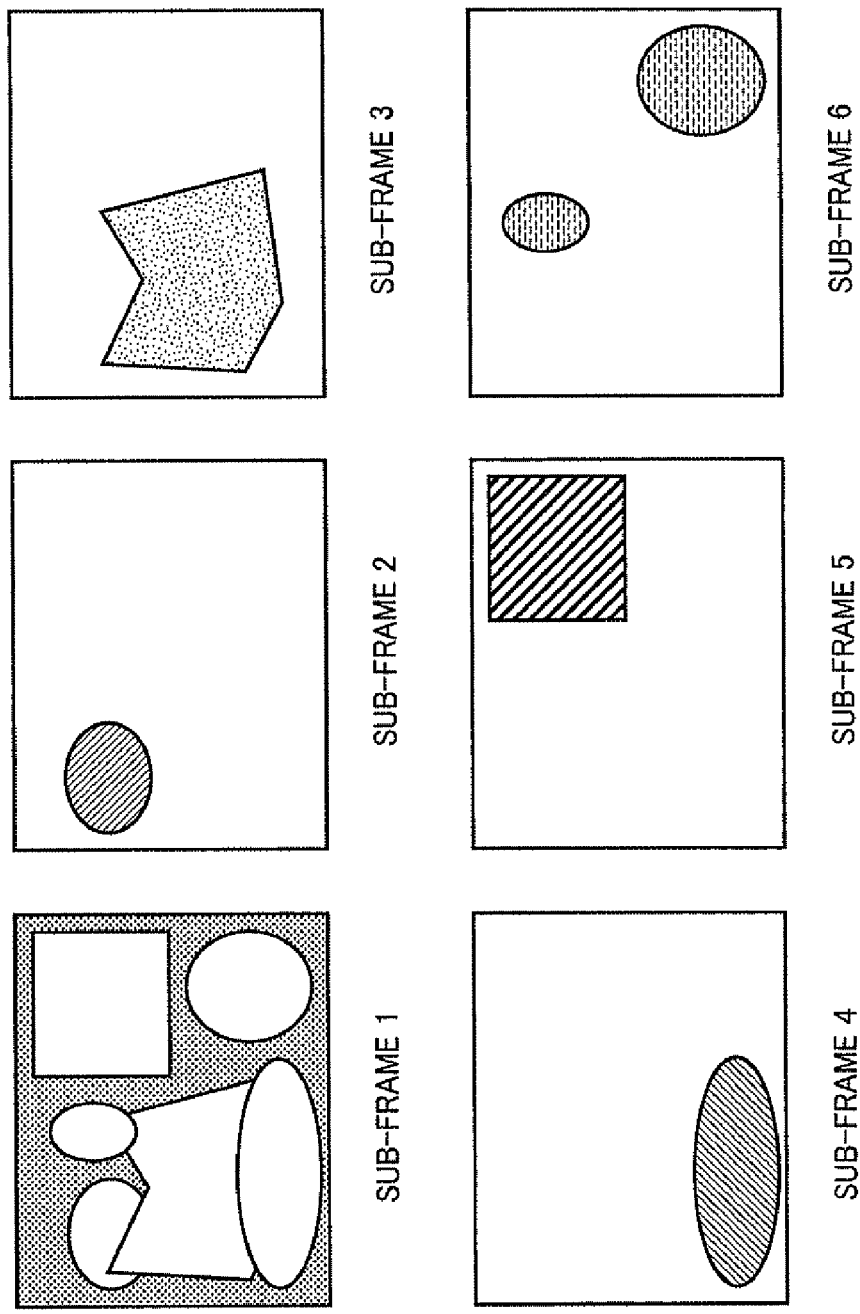
FIG. 22 is a front view illustrating a plurality of sub-frames generated for displaying the exemplary image depicted in FIG. 21.

In contrast, as exemplified in FIG. 21, when another particular type of an image attempts to be displayed in which a plurality of objects that are not always equal in focal length are arranged, with some of the objects overlapping, one pixel is assigned a plurality of focal lengths, for some of the entire pixels. A plurality of sub-frames for displaying such an image are exemplified in FIG. 22.

In the example, one pixel is assigned to a plurality of sub-frames, for some of the entire pixels. If such an image is displayed, then the viewer perceives the image, as if a plurality of objects each of which is transparent and which have different focus positions, are superimposed on each other to form a multilayer. In the example, the plurality of sub-frames can be considered as forming a multilayer structure.

The invention would allow any of those two types of images to be displayed appropriately.

Next, an illustrative fifth embodiment of the invention will be described below. Because the present embodiment has many common elements to those of the first embodiment, the common elements will be referenced the same reference numerals or names as those in the description and illustration of the first embodiment, without redundant description or illustration, while only different elements of the present embodiment from those of the first embodiment will be described and illustrated in more detail.

Figure 15:
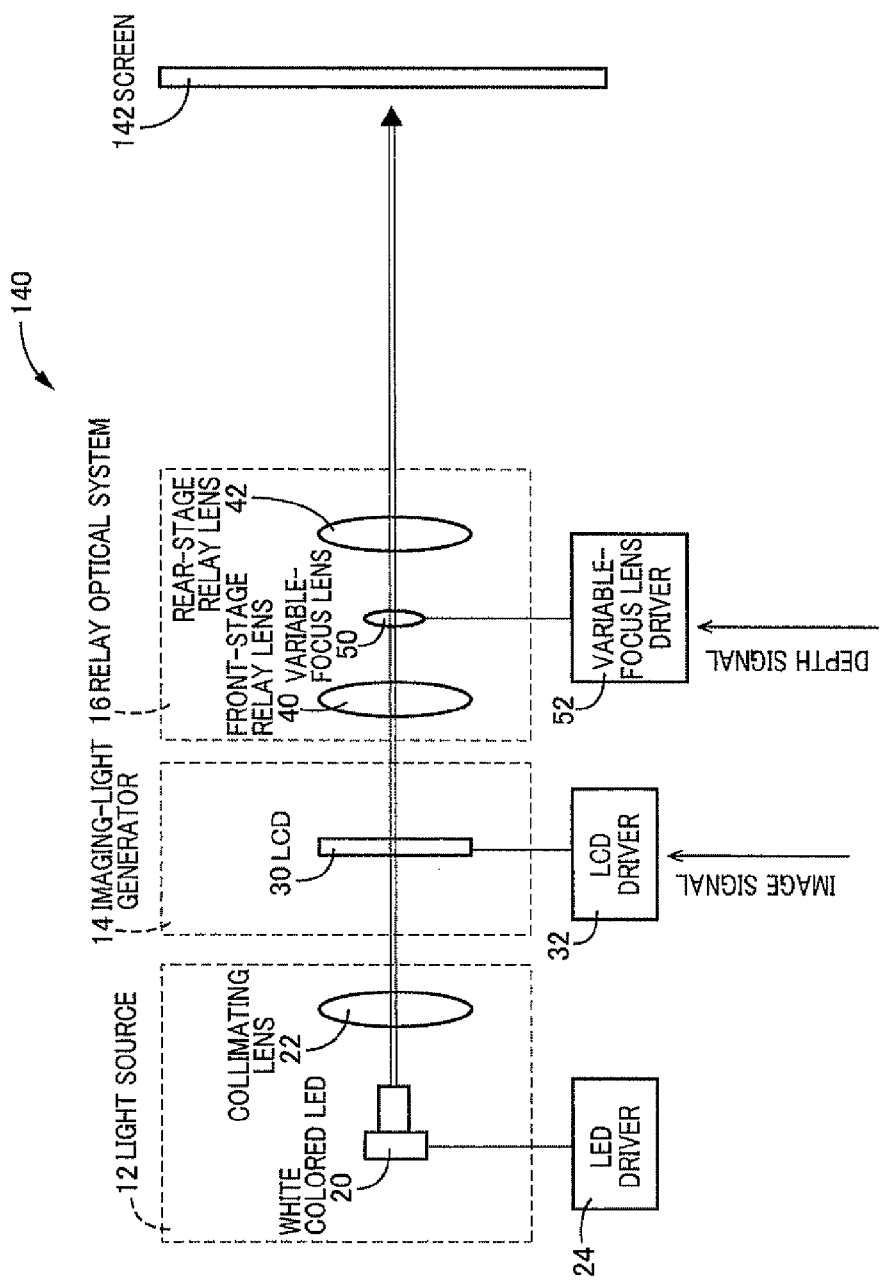
FIG. 15 is a schematic diagram conceptually illustrating a liquid-crystal projector 140 according to an illustrative fifth embodiment of the invention.

FIG. 15 illustrates a liquid-crystal projector 140 according to the present embodiment. The liquid-crystal projector 140 is an image display device configured to project a display image onto a physical display screen, to thereby display a display image to a viewer.

The liquid-crystal projector 140 is generally configured to spatially modulate surface light emitted from a light source at a time, using a spatial light modulator, on a per-pixel basis, and project the thus-generated imaging light onto the display screen, to thereby allow the viewer to view an image as an actual image.

More specifically, the liquid-crystal projector 140, as with the head-mounted display device 10 according to the first embodiment, is generally configured to include the light source 12; the imaging-light generator 14; and the relay optical system 16, in a linear array, in the description order. The liquid-crystal projector 140 does not include the eyepiece optical system 18, as different from the head-mounted display device 10.

Figure 16:
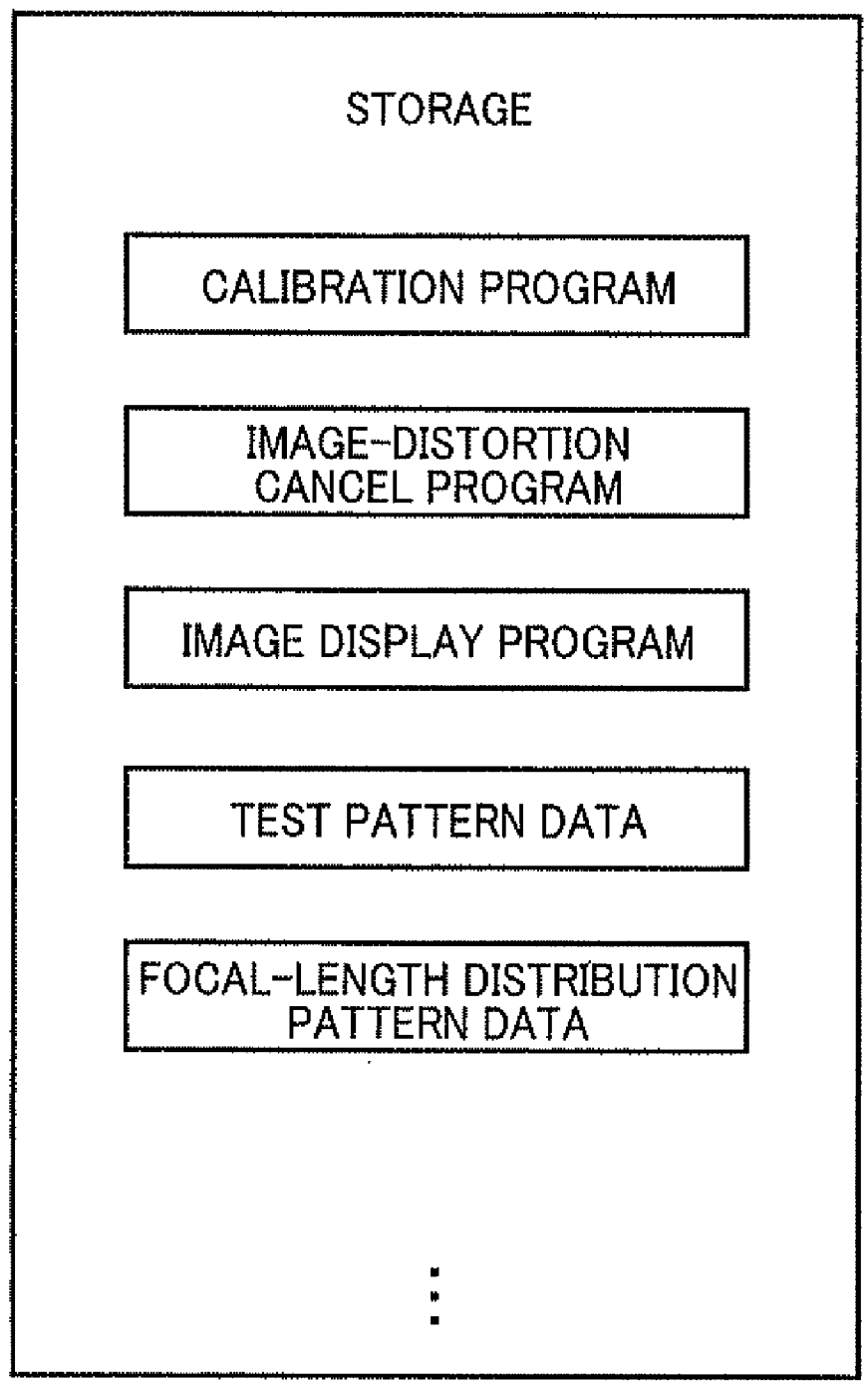
FIG. 16 is a block diagram conceptually illustrating the content of a storage 74 of the liquid-crystal projector 140 depicted in FIG. 15.

The LED driver 24, the LCD driver 32 and the variable-focus lens driver 52 illustrated in FIG. 15 are controlled by the signal processing unit 70 illustrated in FIG. 3. FIG. 16 illustrates conceptually the content of the storage 74 within the signal processing unit 70. As illustrated in FIG. 16, in the storage 74, the calibration program, the image display program and the test pattern data have been previously stored in a non-volatile manner, as with the first embodiment. These programs and data, which are common to those in the first embodiment, will not be described redundantly.

In the storage 74, there have also previously been stored in a non-volatile manner, an image-distortion cancel program, which is a unique program, and a focal-length distribution pattern data required for execution of the image-distortion cancel program.

Figure 17:
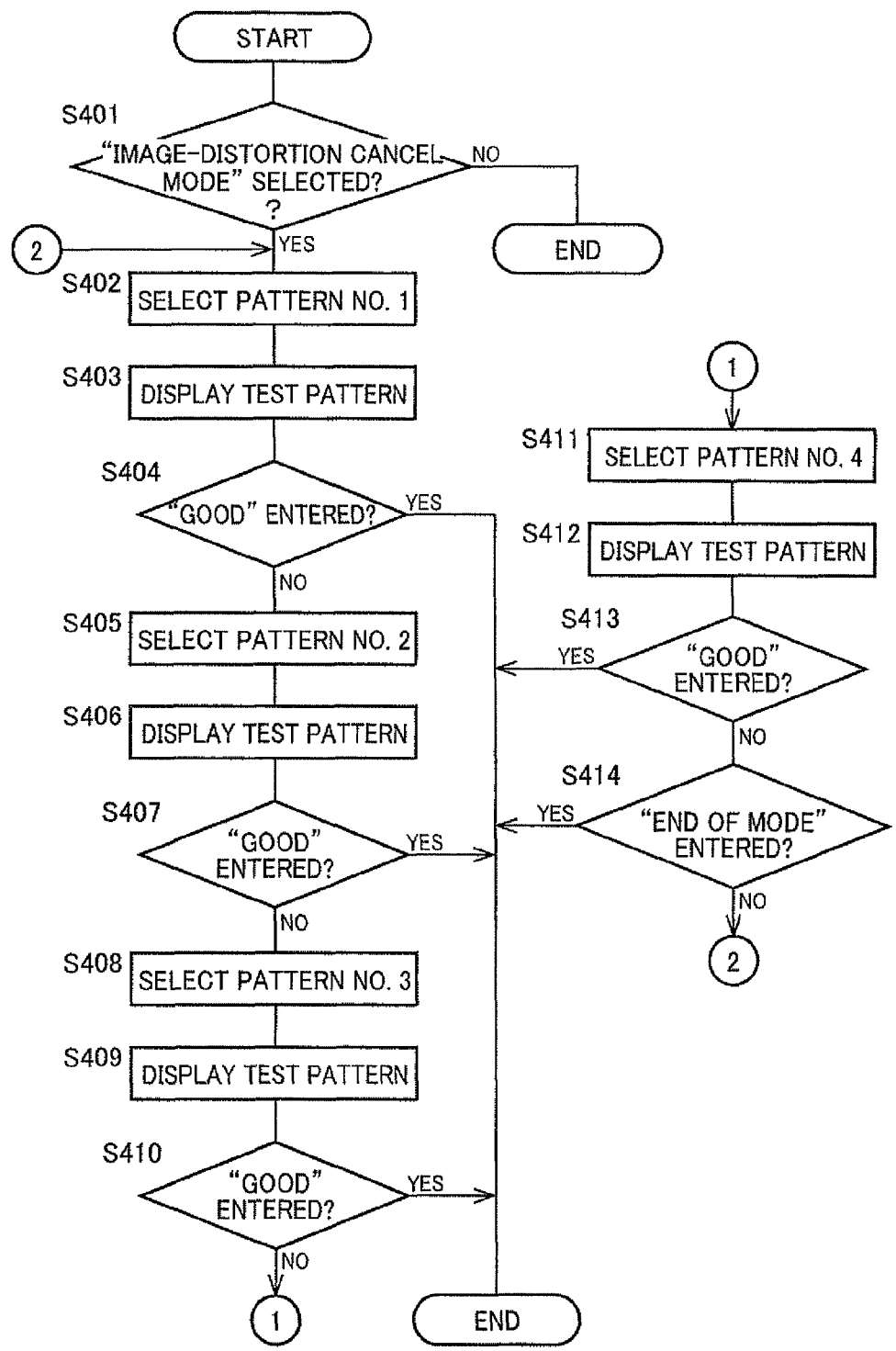
FIG. 17 is a flow chart conceptually illustrating an image-distortion cancel program depicted in FIG. 16.

FIG. 17 illustrates the image-distortion cancel program in flow chart conceptually.

The image-distortion cancel program is executed, when the liquid-crystal projector 140 projects a display image onto a display screen 142, fuzzily or out of focus, due to geometrical image-distortion caused by inadequate perpendicularity of the display screen 142 to an optical axis of the liquid-crystal projector 140, or by warping or curvature of the display screen 142, in order to cancel the image distortion by software.

More specifically, the image-distortion cancel program is executed such that distribution profile of wavefront curvatures or focal lengths of the imaging light impinging on the display screen 142 is redefined, so that geometrical distortion of the display image projected onto the display screen 142 can be cancelled.

Still more specifically, the image-distortion cancel program, when executed, uses a plurality of pre-prepared focal-length distribution patterns indicative of focal-length distribution profiles allowing for effective cancel of geometrical distortion of the display image.

FIG. 18 illustrates four focal-length distribution patterns, by way of example. Focal-length distribution pattern No. 1 is a pattern in which the focal length becomes shorter as it moves from the left-hand side to the right-hand side in a display image. Focal-length distribution pattern No. 2 is a pattern in which the focal length becomes longer as it moves from the left-hand side to the right-hand side in a display image. Focal-length distribution pattern No. 3 is a pattern in which the focal length becomes shorter as it moves from the top to the bottom in a display image. Focal-length distribution pattern No. 4 is a pattern in which the focal length becomes longer as it moves from the top to the bottom in a display image.

FIG. 17 illustrates the image-distortion cancel program in flow chart conceptually. The image-distortion cancel program is executed in response to a user's action of activating a power supply (not shown) of the liquid-crystal projector 140.

The image-distortion cancel program begins with step S401 to determine whether or not the user has selected an "image-distortion cancel mode," via an input device (not shown). If not, then the image-distortion cancel program is terminated immediately.

If, however, the user has selected the "image-distortion cancel mode," then step S402 is implemented to select focal-length distribution pattern No. 1 as a current focal-length distribution pattern, and to generate a one-frame-worth depth signal, based on the selected focal-length distribution pattern.

Step S403 is followed to display a test pattern such as illustrated in FIG. 6A, so as to reflect the current focal-length distribution pattern, based on the generated depth signal and the test pattern data.

Step S404 is followed to make a determination as to whether the user has entered data indicative of "good," via the input device, into the computer 72, for the user to indicate that the user has perceived the displayed test pattern sharply.

If the user, this time, has entered data indicative of "good," then the determination of step S404 becomes "YES," and the execution of the image-distortion cancel program is terminated. The current focal-length distribution pattern, which acts as a bias, will be added to a depth signal which will be generated as a result of the subsequent execution of the image display program.

If, however, this time, the user has not entered data indicative of "good," then the determination of step S404 becomes "No," and it goes to step S405.

Step S405 is implemented to select focal-length distribution pattern No. 2 as a current focal-length distribution pattern, and to generate a one-frame-worth depth signal, based on the selected focal-length distribution pattern.

Step S406 is followed to display the test pattern, so as to reflect the current focal-length distribution pattern, based on the generated depth signal and the test pattern data.

Step S407 is followed to make a determination as to whether the user has entered data indicative of "good." If the user, this time, has entered data indicative of "good," then the determination of step S407 becomes "YES," and the execution of the image-distortion cancel program is terminated.

The current focal-length distribution pattern, which acts as a bias, will be added to a depth signal which will be generated as a result of the subsequent execution of the image display program.

If, however, this time, the user has not entered data indicative of "good," then the determination of step S407 becomes "No," and it goes to step S408.

Step S408 is implemented to select focal-length distribution pattern No. 3 as a current focal-length distribution pattern, and to generate an one-frame-worth depth signal, based on the selected focal-length distribution pattern.

Step S409 is followed to display the test pattern, so as to reflect the current focal-length distribution pattern, based on the generated depth signal and the test pattern data.

Step S410 is followed to make a determination as to whether the user has entered data indicative of "good." If the user, this time, has entered data indicative of "good," then the determination of step S410 becomes "YES," and the execution of the image-distortion cancel program is terminated. The current focal-length distribution pattern, which acts as a bias, will be added to a depth signal which will be generated as a result of the subsequent execution of the image display program.

If, however, this time, the user has not entered data indicative of "good," then the determination of step S410 becomes "No," and it goes to step S411.

Step S411 is implemented to select focal-length distribution pattern No. 4 as a current focal-length distribution pattern, and to generate an one-frame-worth depth signal, based on the selected focal-length distribution pattern.

Step S412 is followed to display the test pattern, so as to reflect the current focal-length distribution pattern, based on the generated depth signal and the test pattern data.

Step S413 is followed to make a determination as to whether the user has entered data indicative of "good." If the user, this time, has entered data indicative of "good," then the determination of step S413 becomes "YES," and the execution of the image-distortion cancel program is terminated. The current focal-length distribution pattern, which acts as a bias, will be added to a depth signal which will be generated as a result of the subsequent execution of the image display program.

If, however, this time, the user has not entered data indicative of "good," then the determination of step S413 becomes "No," and it goes to step S414.

Step S414 is implemented to determine whether or not the user has selected an "end of mode" via the input device. If the user, this time, has selected the "end of mode," then the execution of the image-distortion cancel program is terminated. If, however, this time, the user has not selected the "end of mode," then it returns to step S402 to display the test pattern again, so as to reflect a different one of the focal-length distribution patterns.

As will be evident from the foregoing, in the present embodiment, it can be considered, for ease of description, that a portion of the computer 72 which is assigned for implementing the image-distortion cancel program illustrated in FIG. 17 constitutes still another example of the "wavefront-curvature adjuster" set forth in the mode (1).

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image display device for optically displaying an image, comprising:
   a light source;
   an imaging-light generator converting light emitted from the light source, into imaging light representative of the image to be displayed, to generate the imaging light;
   a relay optical system focusing the imaging light emitted from the imaging-light generator, on an image plane which is located at an optically conjugate position to the imaging-light generator, the relay optical system defining a pupil through which the imaging light passes, the pupil located within the relay optical system, the imaging light having a minimum diameter at a position of the pupil;
   a variable-focus lens disposed at a position generally coincident with the pupil, the variable-focus lens having a varying focal length; and
   a wavefront-curvature adjuster configured to vary the focal length by operating the variable-focus lens, to adjust a wavefront curvature of the imaging light emitted from the relay optical system.

2. The image display device according to claim 1, wherein the wavefront-curvature adjuster includes a modulator modulating the wavefront curvature based on depth information of the image.

3. The image display device according to claim 1, wherein the image is made up of a series of successive frames,
   the imaging-light generator includes a generating section configured to generate the imaging light, on a per-frame basis, so that a plurality of pixels representing each frame are displayed at a time, and
   the wavefront-curvature adjuster includes an adjusting section configured to adjust the wavefront curvature, on a per-frame basis, in synchronization with display of the successive frames.

4. The image display device according to claim 1, wherein the image is made up of a collection of a plurality of pixels, and
   the wavefront-curvature adjuster includes an adjusting section configured to adjust the wavefront curvature, on a per-pixel basis or a per-pixel-group basis.

5. The image display device according to claim 1, wherein the image is made up of a series of successive frames,
   each frame is made up of a collection of a plurality of pixels,
   the imaging-light generator includes a generating section configured to generate the imaging light, on a per-frame basis, so that the plurality of pixels representing each frame are displayed in a time-division sequence, on a per-pixel basis or a per-pixel-group basis, and the wavefront-curvature adjuster includes an adjusting section configured to adjust the wavefront curvature, on a per-pixel basis or a per-pixel-group basis, in synchronization with display of the successive pixels or pixels groups.

6. The image display device according to claim 1, wherein the variable-focus lens includes at least one of a liquid-crystal lens, a liquid lens, and a movable lens which is movable along an optical axis of the relay optical system.

7. The image display device according to claim 1, wherein the imaging-light generator includes at least one of an optical scanner, and a spatial light modulator.

8. The image display device according to claim 7, wherein the imaging-light generator includes the spatial light modulator, and the spatial light modulator includes at least one of a liquid-crystal display, an organic electroluminescence display, and a digital micro-mirror device.

9. The image display device according to claim 1, further comprising:
   an eyepiece optical system disposed downstream of the relay optical system, and
   a wavefront-curvature offset mechanism configured to move the eyepiece optical system along an optical axis of the eyepiece optical system, and holding the eyepiece optical system at an arbitrarily-selected position, to offset the wavefront curvature from a default value.

10. The image display device according to claim 1, further comprising a calibrator configured to move the variable-focus lens along an optical axis of the relay optical system, and holding the variable-focus lens at an arbitrarily-selected position, to calibrate a location of the variable-focus lens relative to the relay optical system.

11. The image display device according to claim 1, wherein
   the relay optical system is configured to have a front-stage relay lens and a rear-stage relay lens,
   the pupil is located at a back focus point of the front-stage relay lens and a front focus point of the rear-stage relay lens, and
   the variable-focus lens is disposed at a position generally coincident with the pupil.

* * * * *